United States Patent
Noda et al.

(10) Patent No.: US 10,901,417 B2
(45) Date of Patent: Jan. 26, 2021

(54) AUTONOMOUS VEHICLE OPERATIONAL MANAGEMENT WITH VISUAL SALIENCY PERCEPTION CONTROL

(71) Applicants: Nissan North America, Inc., Franklin, TN (US); Renault S.A.S., Boulogne-Billancourt (FR)

(72) Inventors: Kuniaki Noda, Kanagawa (JP); Kyle Hollins Wray, Amherst, MA (US); Stefan Witwicki, San Carlos, CA (US)

(73) Assignees: Nissan North America, Inc., Franklin, TN (US); Renault S.A.S., Boulogne-Billancourt (FR)

( * ) Notice: Subject to any disclaimer, the term of this patent is extended or adjusted under 35 U.S.C. 154(b) by 228 days.

(21) Appl. No.: 16/119,260

(22) Filed: Aug. 31, 2018

(65) Prior Publication Data
US 2020/0073382 A1 Mar. 5, 2020

(51) Int. Cl.
*G05D 1/00* (2006.01)
*B60W 60/00* (2020.01)
(Continued)

(52) U.S. Cl.
CPC ......... *G05D 1/0088* (2013.01); *G05D 1/0221* (2013.01); *G05D 1/0231* (2013.01);
(Continued)

(58) Field of Classification Search
CPC .. G08G 1/00; G08G 1/16; G05D 1/00; G05D 1/0088; G05D 1/0221; G05D 1/0276;
(Continued)

(56) References Cited

U.S. PATENT DOCUMENTS

| 8,527,139 B1* | 9/2013 | Yousuf | G06F 11/2242 |
| | | | 180/65.1 |
| 9,494,935 B2* | 11/2016 | Okumura | B60W 30/00 |

(Continued)

OTHER PUBLICATIONS

International Application No. PCT/US2017/017493, filed Feb. 10, 2017.

(Continued)

*Primary Examiner* — Yonel Beaulieu
(74) *Attorney, Agent, or Firm* — Young Basile Hanlon & MacFarlane, P.C.

(57) ABSTRACT

Autonomous vehicle operational management with visual saliency perception control may include operating a perception unit and an autonomous vehicle operational management controller. Operating the perception unit may include generating external object information based on image data received from image capture units of the vehicle and saliency information received from the autonomous vehicle operational management controller. Operating the autonomous vehicle operational management controller may include identifying a distinct vehicle operational scenario based on the external object information, instantiating a scenario-specific operational control evaluation module instance, receiving a candidate vehicle control action from a policy for the scenario-specific operational control evaluation module instance, and controlling the autonomous vehicle to traverse a portion of the vehicle transportation network in accordance with the candidate vehicle control action, wherein the portion of the vehicle transportation network includes the distinct vehicle operational scenario.

18 Claims, 13 Drawing Sheets

(51) Int. Cl.
    *G05D 1/02*    (2020.01)
    *G06K 9/00*    (2006.01)
    *G06T 7/73*    (2017.01)
(52) U.S. Cl.
    CPC ....... *G05D 1/0276* (2013.01); *G06K 9/00805* (2013.01); *G06T 7/75* (2017.01); *G05D 2201/0213* (2013.01); *G06T 2207/20164* (2013.01); *G06T 2207/30252* (2013.01)
(58) Field of Classification Search
    CPC ... G06T 7/00; G06T 7/75; G06K 9/00; G06K 9/00805; B60W 60/00
    See application file for complete search history.

(56) References Cited

U.S. PATENT DOCUMENTS

| | | | | |
|---|---|---|---|---|
| 9,495,874 | B1* | 11/2016 | Zhu | G08G 1/165 |
| 10,334,050 | B2* | 6/2019 | Kentley-Klay | H04L 67/125 |
| 10,380,886 | B2* | 8/2019 | Ran | H04L 67/00 |
| 10,401,852 | B2* | 9/2019 | Levinson | G05D 1/0044 |
| 10,446,037 | B2* | 10/2019 | Kentley-Klay | G08G 1/202 |
| 10,591,910 | B2* | 3/2020 | Levinson | G06N 99/005 |
| 10,649,458 | B2* | 5/2020 | Sun | B62D 15/0255 |
| 2016/0086050 | A1 | 3/2016 | Piekniewski et al. | |
| 2017/0206426 | A1 | 7/2017 | Schrier et al. | |
| 2018/0031831 | A1 | 2/2018 | Iwase et al. | |

OTHER PUBLICATIONS

International Application No. PCT/US2017/017502, filed Feb. 10, 2017.
International Application No. PCT/US2017/017516, filed Feb. 10, 2017.
International Application No. PCT/US2017/017527, filed Feb. 10, 2017.
Li, Guanbin et al., Visual Saliency Based on Multiscale Deep Features, IEEE Conference on Computer Vision and Pattern Recognition (CVPR), 2015, pp. 5455-5463, Computer Vision Foundation.

* cited by examiner

AUTONOMOUS VEHICLE OPERATIONAL MANAGEMENT WITH VISUAL SALIENCY PERCEPTION CONTROL

TECHNICAL FIELD

This disclosure relates to autonomous vehicle operational management, autonomous driving, and vehicle perception.

BACKGROUND

A vehicle, such as an autonomous vehicle, may traverse a portion of a vehicle transportation network. Traversing the portion of the vehicle transportation network may include generating or capturing, such as by a sensor of the vehicle, data, such as data representing an operational environment, or a portion thereof, of the vehicle. Accordingly, a system, method, and apparatus for autonomous vehicle operational management with visual saliency perception control may be advantageous.

SUMMARY

Disclosed herein are aspects, features, elements, implementations, and embodiments of autonomous vehicle operational management with visual saliency perception control.

An aspect of the disclosed embodiments is a method for use in traversing a vehicle transportation network by an autonomous vehicle, wherein the autonomous vehicle includes a perception unit and an autonomous vehicle operational management controller. Traversing the vehicle transportation network includes operating the perception unit and operating the autonomous vehicle operational management controller. Operating the perception unit includes the perception unit receiving saliency information from the autonomous vehicle operational management controller, generating, based on the saliency information, external object information corresponding to one or more external objects within a defined distance of the autonomous vehicle, and outputting the external object information to the autonomous vehicle operational management controller. Operating the autonomous vehicle operational management controller includes the autonomous vehicle operational management controller generating an autonomous vehicle operational control environment for operating a scenario-specific operational control evaluation module instance, wherein the scenario-specific operational control evaluation module instance includes an instance of a scenario-specific operational control evaluation model of a distinct vehicle operational scenario, and wherein operating the scenario-specific operational control evaluation module instance includes identifying a policy for the scenario-specific operational control evaluation model. Operating the autonomous vehicle operational management controller includes the autonomous vehicle operational management controller identifying the distinct vehicle operational scenario based on the external object information, instantiating the scenario-specific operational control evaluation module instance, receiving a candidate vehicle control action from the policy for the scenario-specific operational control evaluation module instance, and controlling the autonomous vehicle to traverse a portion of the vehicle transportation network in accordance with the candidate vehicle control action, wherein the portion of the vehicle transportation network includes the distinct vehicle operational scenario.

Another aspect of the disclosed embodiments is an autonomous vehicle including an autonomous vehicle operational management controller and a perception unit. The perception unit is configured to execute instructions stored on a non-transitory computer readable medium to receive saliency information from the autonomous vehicle operational management controller, generate, based on the saliency information, external object information corresponding to one or more external objects within a defined distance of the autonomous vehicle, and output the external object information to the autonomous vehicle operational management controller. The autonomous vehicle operational management controller is configured to execute instructions stored on a non-transitory computer readable medium to generate an autonomous vehicle operational control environment for operating a scenario-specific operational control evaluation module instance, wherein the scenario-specific operational control evaluation module instance includes an instance of a scenario-specific operational control evaluation model of a distinct vehicle operational scenario, and wherein operating the scenario-specific operational control evaluation module instance includes identifying a policy for the scenario-specific operational control evaluation model, identify the distinct vehicle operational scenario based on the external object information, instantiate the scenario-specific operational control evaluation module instance, receive a candidate vehicle control action from the policy for the scenario-specific operational control evaluation module instance, and control the autonomous vehicle to traverse a portion of the vehicle transportation network in accordance with the candidate vehicle control action, wherein the portion of the vehicle transportation network includes the distinct vehicle operational scenario.

Another aspect of the disclosed embodiments is a is a method for use in traversing a vehicle transportation network by an autonomous vehicle wherein the autonomous vehicle includes a perception unit and an autonomous vehicle operational management controller. Traversing the vehicle transportation network includes operating the perception unit and operating the autonomous vehicle operational management controller. Operating the perception unit includes receiving saliency information from the autonomous vehicle operational management controller, wherein the saliency information indicates, for each saliency sector from a plurality of non-overlapping saliency sectors relative to the autonomous vehicle, a respective priority and a respective saliency distance relative to the autonomous vehicle. Operating the perception unit includes receiving sensor information from sensors of the autonomous vehicle, and generating, based on the saliency information and the sensor information, external object information corresponding to one or more external objects within a defined distance of the autonomous vehicle. Generating the external object information includes identifying a salient portion of the sensor information based on the saliency information such that the sensor information is a sum of the salient portion and a non-salient portion of the sensor information, wherein identifying the salient portion includes identifying the salient portion such that the salient portion spatially corresponds with a saliency sector indicated as having a high priority in the saliency information, and wherein identifying the salient portion includes determining a size of the salient portion based on the saliency distance, and generating the external object information based on the salient portion such that generating the external object information omits using the non-salient portion. Operating the perception unit includes outputting the external object information to the autonomous vehicle operational management controller. Operating the autonomous vehicle operational management controller includes the autonomous vehicle operational management controller generating an autonomous vehicle operational control environment for operating a scenario-specific operational control evaluation module instance, wherein the scenario-specific operational control evaluation module instance includes an instance of a scenario-specific operational control evaluation model of a distinct vehicle operational scenario, and wherein operating the scenario-specific operational control evaluation module instance includes identifying a policy for the scenario-specific operational control evaluation model. Operating the autonomous vehicle operational management controller includes the autonomous vehicle operational management controller identifying the distinct vehicle operational scenario based on the external object information, instantiating the scenario-specific operational control evaluation module instance, receiving a candidate vehicle control action from the policy for the scenario-specific operational control evaluation module instance, and controlling the autonomous vehicle to traverse a portion of the vehicle transportation network in accordance with the candidate vehicle control action, wherein the portion of the vehicle transportation network includes the distinct vehicle operational scenario.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which.

DETAILED DESCRIPTION

A vehicle, such as an autonomous vehicle, or a semi-autonomous vehicle, may traverse a portion of a vehicle transportation network. The vehicle may include one or more sensors and traversing the vehicle transportation network may include the sensors generating or capturing sensor data, such as data corresponding to an operational environment of the vehicle, or a portion thereof. For example, the sensor data may include information corresponding to one or more external objects, such as pedestrians, remote vehicles, other objects within the vehicle operational environment, vehicle transportation network geometry, or a combination thereof.

The autonomous vehicle may include an autonomous vehicle operational management system, which may include one or more operational environment monitors that may process operational environment data, such as the sensor data, for the autonomous vehicle. The autonomous vehicle operational management system may detect one or more operational scenarios and may instantiate respective instances of scenario-specific operational control evaluation modules in response to detecting the corresponding operational scenarios. The autonomous vehicle operational management controller may receive vehicle control actions from respective instantiated scenario-specific operational control evaluation module instances and may control the autonomous vehicle to traverse a portion of the vehicle transportation network according to the identified vehicle control action.

A vehicle implementing autonomous vehicle operational management with visual saliency perception control may include a perception unit, which may receive saliency information indicating one or more defined regions of a visual field surrounding the vehicle and may use the saliency information to perform object detection using a deep learning algorithm. The autonomous vehicle operational management system may receive external object information from the perception system, may traverse a portion of the vehicle transportation network based on the external object information, and may generate saliency information based on vehicle transportation network information, projected external object information, or a combination thereof. The autonomous vehicle operational management system may provide the saliency information to the perception system for use in subsequent object detection.

Although described herein with reference to an autonomous vehicle, the methods and apparatus described herein may be implemented in any vehicle capable of autonomous or semi-autonomous operation. Although described with reference to a vehicle transportation network, the method and apparatus described herein may include the autonomous vehicle operating in any area navigable by the vehicle.

Figure 1:
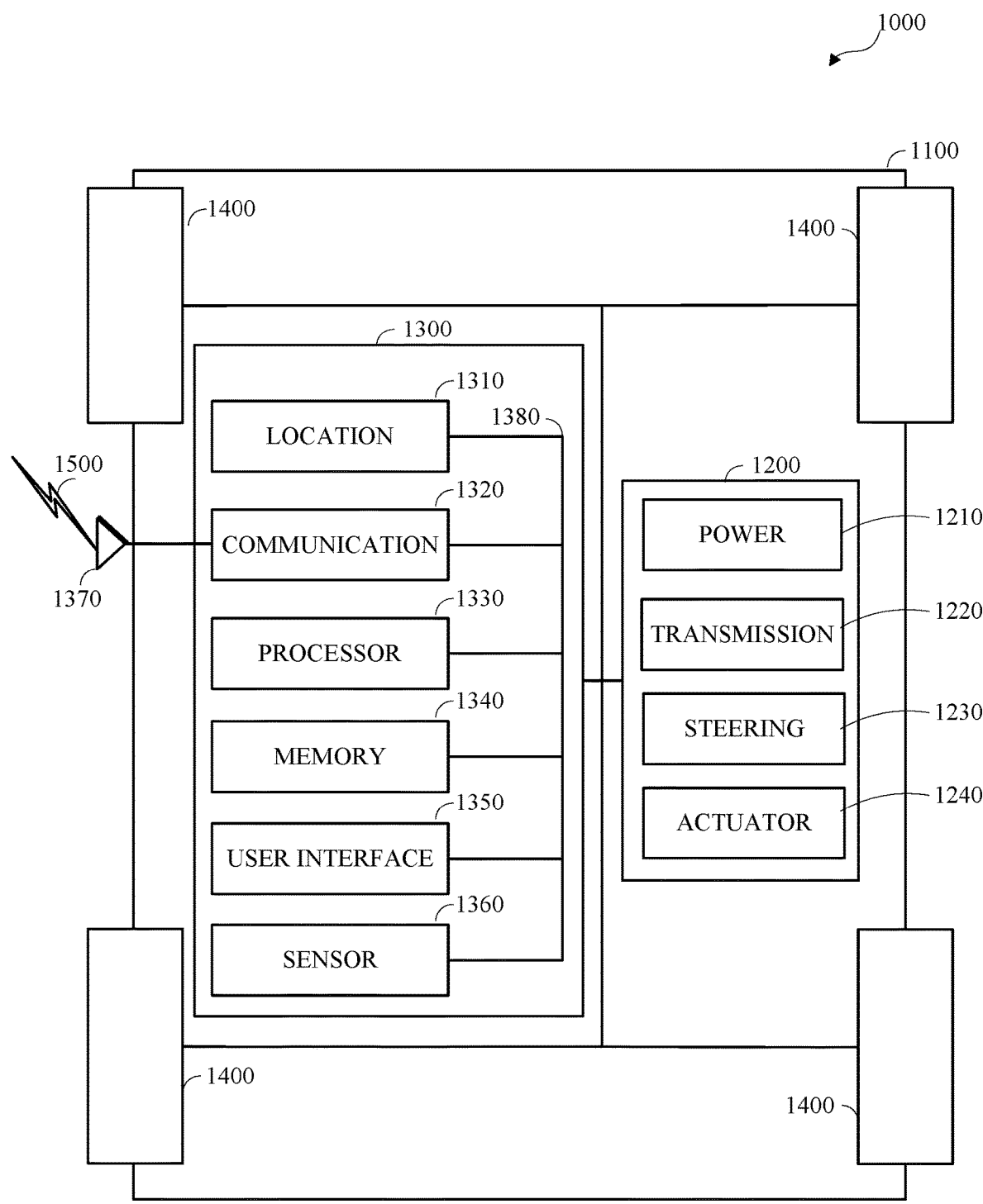
FIG. 1 is a diagram of an example of a vehicle in which the aspects, features, and elements disclosed herein may be implemented.

FIG. 1 is a diagram of an example of a vehicle in which the aspects, features, and elements disclosed herein may be implemented. As shown, a vehicle 1000 includes a chassis 1100, a powertrain 1200, a controller 1300, and wheels

1400. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include controlling a kinetic state of the vehicle, such as by accelerating or decelerating, controlling a directional state of the vehicle, such as by steering, or otherwise controlling the vehicle 1000.

As shown, the powertrain 1200 includes a power source 1210, a transmission 1220, a steering unit 1230, and an actuator 1240. Other elements or combinations of elements of a powertrain, such as a suspension, a drive shaft, axles, or an exhaust system may be included. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor and may be operative to provide kinetic energy as a motive force to one or more of the wheels 1400. The power source 1210 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the controller 1300 the actuator 1240 or both. The steering unit 1230 may be controlled by the controller 1300 the actuator 1240 or both and may control the wheels 1400 to steer the vehicle. The actuator 1240 may receive signals from the controller 1300 and may actuate or control the power source 1210, the transmission 1220, the steering unit 1230, or any combination thereof to operate the vehicle 1000.

As shown, the controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and the processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

The processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

The memory 1340 may include any tangible non-transitory computer-usable or computer-readable medium, capable of, for example, containing, storing, communicating, or transporting machine readable instructions, or any information associated therewith, for use by or in connection with the processor 1330. The memory 1340 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 may be configured to transmit or receive signals via a wired or wireless electronic communication medium 1500, such as via the communication interface 1370. Although not explicitly shown in FIG. 1, the communication unit 1320 may be configured to transmit, receive, or both via any wired or wireless communication medium, such as radio frequency (RF), ultraviolet (UV), visible light, fiber optic, wireline, or a combination thereof. Although FIG. 1 shows a single communication unit 1320 and a single communication interface 1370, any number of communication units and any number of communication interfaces may be used. In some embodiments, the communication unit 1320 may include a dedicated short-range communications (DSRC) unit, an on-board unit (OBU), or a combination thereof.

The location unit 1310 may determine geolocation information, such as longitude, latitude, elevation, direction of travel, or speed, of the vehicle 1000. For example, the location unit may include a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person and a touch display for performing visual and touch-based communication with the person. The user interface 1350 may include multiple displays, such as multiple physically separate units, multiple defined portions within a single physical unit, or a combination thereof.

The sensor 1360 may include one or more sensors, such as an array of sensors, which may be operable to provide information that may be used to control the vehicle. The sensors 1360 may provide information regarding current operating characteristics of the vehicle 1000. The sensor 1360 can include, for example, a speed sensor, acceleration sensors, a steering angle sensor, traction-related sensors, braking-related sensors, steering wheel position sensors, eye tracking sensors, seating position sensors, or any sensor, or combination of sensors, operable to report information regarding some aspect of the current dynamic situation of the vehicle 1000.

The sensor 1360 may include one or more sensors operable to obtain information regarding the physical environment surrounding the vehicle 1000. For example, one or more sensors may detect road geometry and features, such as lane lines, and obstacles, such as fixed obstacles, vehicles, and pedestrians. The sensor 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be a combined unit.

Although not shown separately, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel, which may be pivoted to a steering angle under control of the steering unit 1230, a propelled wheel, which may be torqued to propel the vehicle 1000 under control of the transmission 1220, or a steered and propelled wheel that may steer and propel the vehicle 1000.

Although not shown in FIG. 1, a vehicle may include units, or elements, not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 1000 may be an autonomous vehicle controlled autonomously, without direct human intervention, to traverse a portion of a vehicle transportation network. Although not shown separately in FIG. 1, an autonomous vehicle may include an autonomous vehicle control unit, which may perform autonomous vehicle routing, navigation, and control. The autonomous vehicle control unit may be integrated with another unit of the vehicle. For example, the controller 1300 may include the autonomous vehicle control unit.

The autonomous vehicle control unit may control or operate the vehicle 1000 to traverse a portion of the vehicle transportation network in accordance with current vehicle operation parameters. The autonomous vehicle control unit may control or operate the vehicle 1000 to perform a defined operation or maneuver, such as parking the vehicle. The autonomous vehicle control unit may generate a route of travel from an origin, such as a current location of the vehicle 1000, to a destination based on vehicle information, environment information, vehicle transportation network data representing the vehicle transportation network, or a combination thereof, and may control or operate the vehicle 1000 to traverse the vehicle transportation network in accordance with the route. For example, the autonomous vehicle control unit may output the route of travel to the trajectory controller, and the trajectory controller may operate the vehicle 1000 to travel from the origin to the destination using the generated route.

Figure 2:
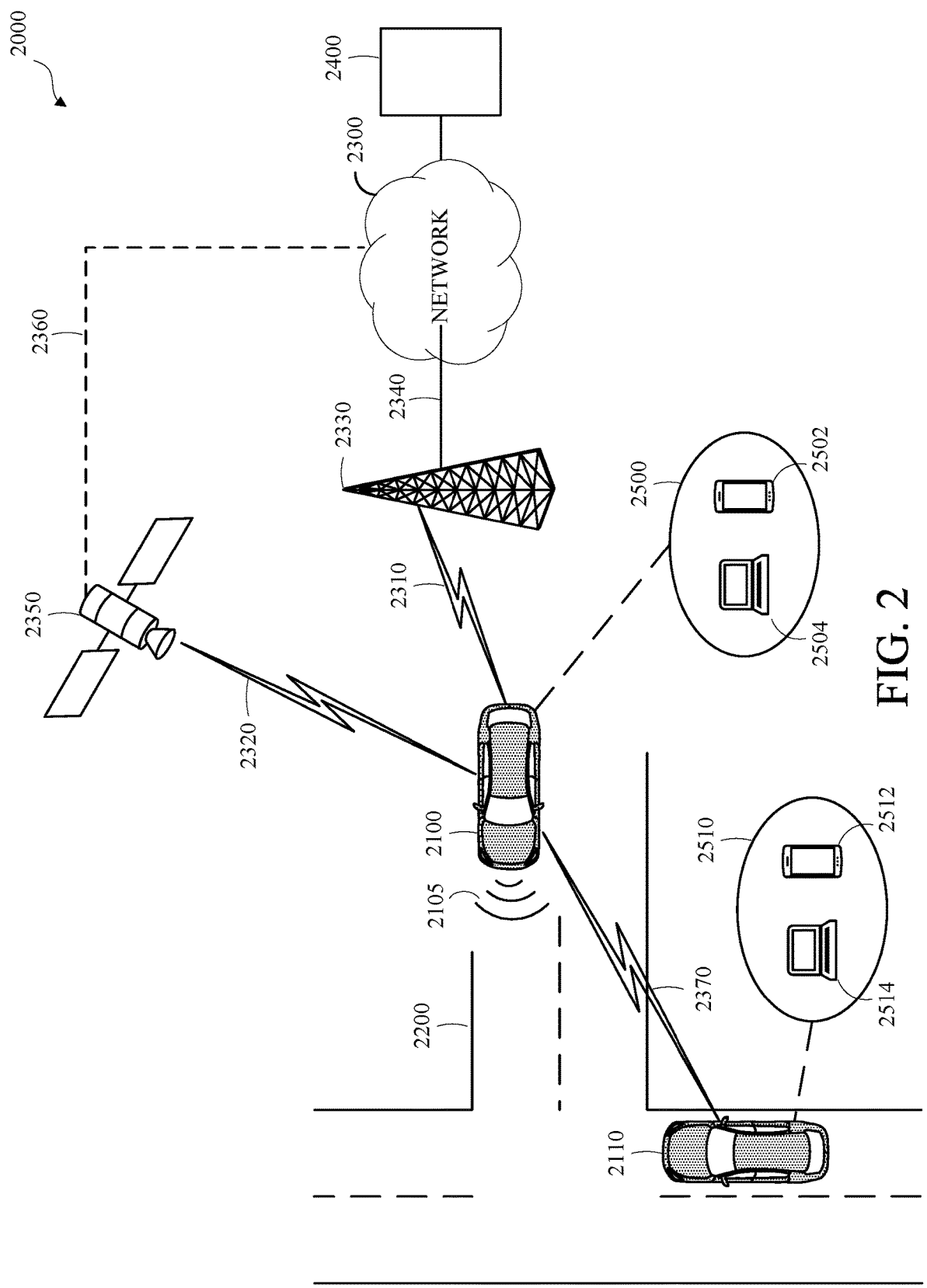
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 2000 may include one or more vehicles 2100/2110, such as the vehicle 1000 shown in FIG. 1, which may travel via one or more portions of one or more vehicle transportation networks 2200 and may communicate via one or more electronic communication networks 2300. Although not explicitly shown in FIG. 2, a vehicle may traverse an area that is not expressly or completely included in a vehicle transportation network, such as an off-road area.

The electronic communication network 2300 may be, for example, a multiple access system and may provide for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the network 2300.

In some embodiments, a vehicle 2100/2110 may communicate via a wired communication link (not shown), a wireless communication link 2310/2320/2370, or a combination of any number of wired or wireless communication links. For example, as shown, a vehicle 2100/2110 may communicate via a terrestrial wireless communication link 2310, via a non-terrestrial wireless communication link 2320, or via a combination thereof. The terrestrial wireless communication link 2310 may include an Ethernet link, a serial link, a Bluetooth link, an infrared (IR) link, an ultraviolet (UV) link, or any link capable of providing for electronic communication.

A vehicle 2100/2110 may communicate with another vehicle 2100/2110. For example, a host, or subject, vehicle (HV) 2100 may receive one or more automated inter-vehicle messages, such as a basic safety message (BSM), from a remote, or target, vehicle (RV) 2110, via a direct communication link 2370, or via a network 2300. For example, the remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). A vehicle 2100/2110 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 2100 may communicate with the communications network 2300 via an access point 2330. The access point 2330, which may include a computing device, may be configured to communicate with a vehicle 2100, with a communication network 2300, with one or more communication devices 2400, or with a combination thereof via wired or wireless communication links 2310/2340. For example, the access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit in FIG. 2, an access point may include any number of interconnected elements.

The vehicle 2100 may communicate with the communications network 2300 via a satellite 2350, or other non-terrestrial communication device. The satellite 2350, which may include a computing device, may be configured to communicate with a vehicle 2100, with a communication network 2300, with one or more communication devices 2400, or with a combination thereof via one or more communication links 2320/2360. Although shown as a single unit in FIG. 2, a satellite may include any number of interconnected elements.

An electronic communication network 2300 may be any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit in FIG. 2, an electronic communication network may include any number of interconnected elements.

The vehicle 2100 may identify a portion or condition of the vehicle transportation network 2200. For example, the vehicle 2100 may include one or more on-vehicle sensors 2105, such as sensor 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200. The sensor data may include lane line data, remote vehicle location data, or both.

The vehicle 2100 may traverse a portion or portions of one or more vehicle transportation networks 2200 using information communicated via the network 2300, such as information representing the vehicle transportation network 2200, information identified by one or more on-vehicle sensors 2105, or a combination thereof.

Although, for simplicity, FIG. 2 shows two vehicles 2100, 2110, one vehicle transportation network 2200, one electronic communication network 2300, and one communication device 2400, any number of vehicles, networks, or computing devices may be used. The vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links. For example, the vehicle 2100 may communicate with the communication device 2400 via a direct communication link, such as a Bluetooth communication link.

In some embodiments, a vehicle 2100/2210 may be associated with an entity 2500/2510, such as a driver, operator, or owner of the vehicle. In some embodiments, an entity 2500/2510 associated with a vehicle 2100/2110 may be associated with one or more personal electronic devices 2502/2504/2512/2514, such as a smartphone 2502/2512 or a computer 2504/2514. In some embodiments, a personal electronic device 2502/2504/2512/2514 may communicate with a corresponding vehicle 2100/2110 via a direct or indirect communication link. Although one entity 2500/2510 is shown as associated with one vehicle 2100/2110 in FIG. 2, any number of vehicles may be associated with an entity and any number of entities may be associated with a vehicle.

Figure 3:
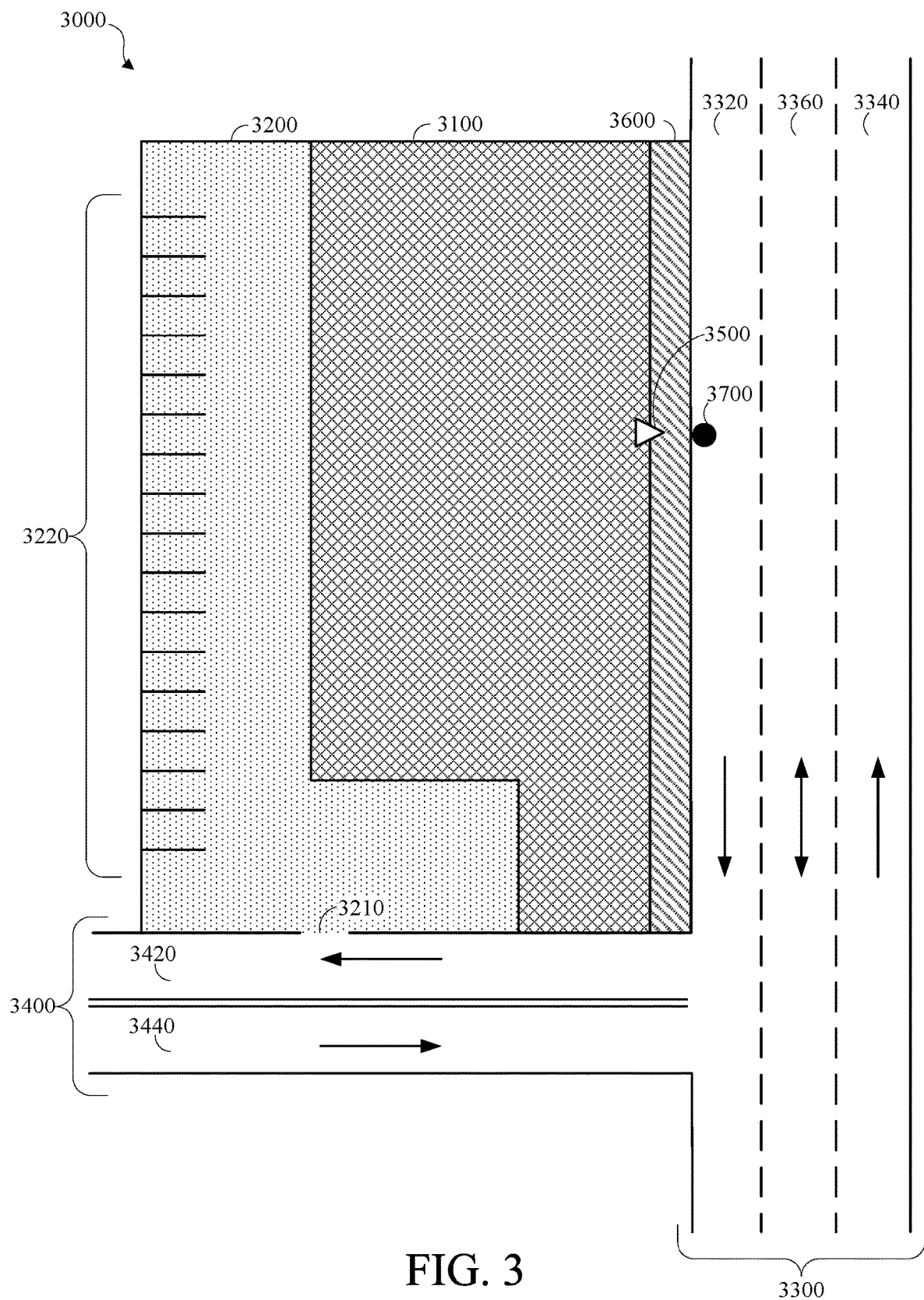
FIG. 3 is a diagram of a portion of a vehicle transportation network in accordance with this disclosure.

FIG. 3 is a diagram of a portion of a vehicle transportation network in accordance with this disclosure. A vehicle transportation network 3000 may include one or more unnavigable areas 3100, such as a building, one or more partially navigable areas, such as parking area 3200, one or more navigable areas, such as roads 3300/3400, or a combination thereof. In some embodiments, an autonomous vehicle, such as the vehicle 1000 shown in FIG. 1, one of the vehicles 2100/2110 shown in FIG. 2, a semi-autonomous vehicle, or any other vehicle implementing autonomous driving, may traverse a portion or portions of the vehicle transportation network 3000.

The vehicle transportation network 3000 may include one or more interchanges 3210 between one or more navigable, or partially navigable, areas 3200/3300/3400. For example, the portion of the vehicle transportation network 3000 shown in FIG. 3 includes an interchange 3210 between the parking area 3200 and road 3400. The parking area 3200 may include parking slots 3220.

A portion of the vehicle transportation network 3000, such as a road 3300/3400, may include one or more lanes 3320/3340/3360/3420/3440 and may be associated with one or more directions of travel, which are indicated by arrows in FIG. 3.

A vehicle transportation network, or a portion thereof, such as the portion of the vehicle transportation network 3000 shown in FIG. 3, may be represented as vehicle transportation network data. For example, vehicle transportation network data may be expressed as a hierarchy of elements, such as markup language elements, which may be stored in a database or file. For simplicity, the figures herein depict vehicle transportation network data representing portions of a vehicle transportation network as diagrams or maps; however, vehicle transportation network data may be expressed in any computer-usable form capable of representing a vehicle transportation network, or a portion thereof. The vehicle transportation network data may include vehicle transportation network control information, such as direction of travel information, speed limit information, toll information, grade information, such as inclination or angle information, surface material information, aesthetic information, defined hazard information, or a combination thereof.

The vehicle transportation network may be associated with, or may include, a pedestrian transportation network. For example, FIG. 3 includes a portion 3600 of a pedestrian transportation network, which may be a pedestrian walkway. Although not shown separately in FIG. 3, a pedestrian navigable area, such as a pedestrian crosswalk, may correspond with a navigable area, or a partially navigable area, of a vehicle transportation network.

A portion, or a combination of portions, of the vehicle transportation network may be identified as a point of interest or a destination. For example, the vehicle transportation network data may identify a building, such as the unnavigable area 3100, and the adjacent partially navigable parking area 3200 as a point of interest, a vehicle may identify the point of interest as a destination, and the vehicle may travel from an origin to the destination by traversing the vehicle transportation network. Although the parking area 3200 associated with the unnavigable area 3100 is shown as adjacent to the unnavigable area 3100 in FIG. 3, a destination may include, for example, a building and a parking area that is physically or geospatially non-adjacent to the building.

Identifying a destination may include identifying a location for the destination, which may be a discrete uniquely identifiable geolocation. For example, the vehicle transportation network may include a defined location, such as a street address, a postal address, a vehicle transportation network address, a GPS address, or a combination thereof for the destination.

A destination may be associated with one or more entrances, such as the entrance 3500 shown in FIG. 3. The vehicle transportation network data may include defined entrance location information, such as information identifying a geolocation of an entrance associated with a destination.

A destination may be associated with one or more docking locations, such as the docking location 3700 shown in FIG. 3. A docking location 3700 may be a designated or undesignated location or area in proximity to a destination at which an autonomous vehicle may stop, stand, or park such that docking operations, such as passenger loading or unloading, may be performed.

The vehicle transportation network data may include docking location information, such as information identifying a geolocation of one or more docking locations 3700 associated with a destination. Although not shown separately in FIG. 3, the docking location information may identify a type of docking operation associated with a docking location 3700. For example, a destination may be associated with a first docking location for passenger loading and a second docking location for passenger unloading. Although an autonomous vehicle may park at a docking location, a docking location associated with a destination may be independent and distinct from a parking area associated with the destination.

Figure 4:
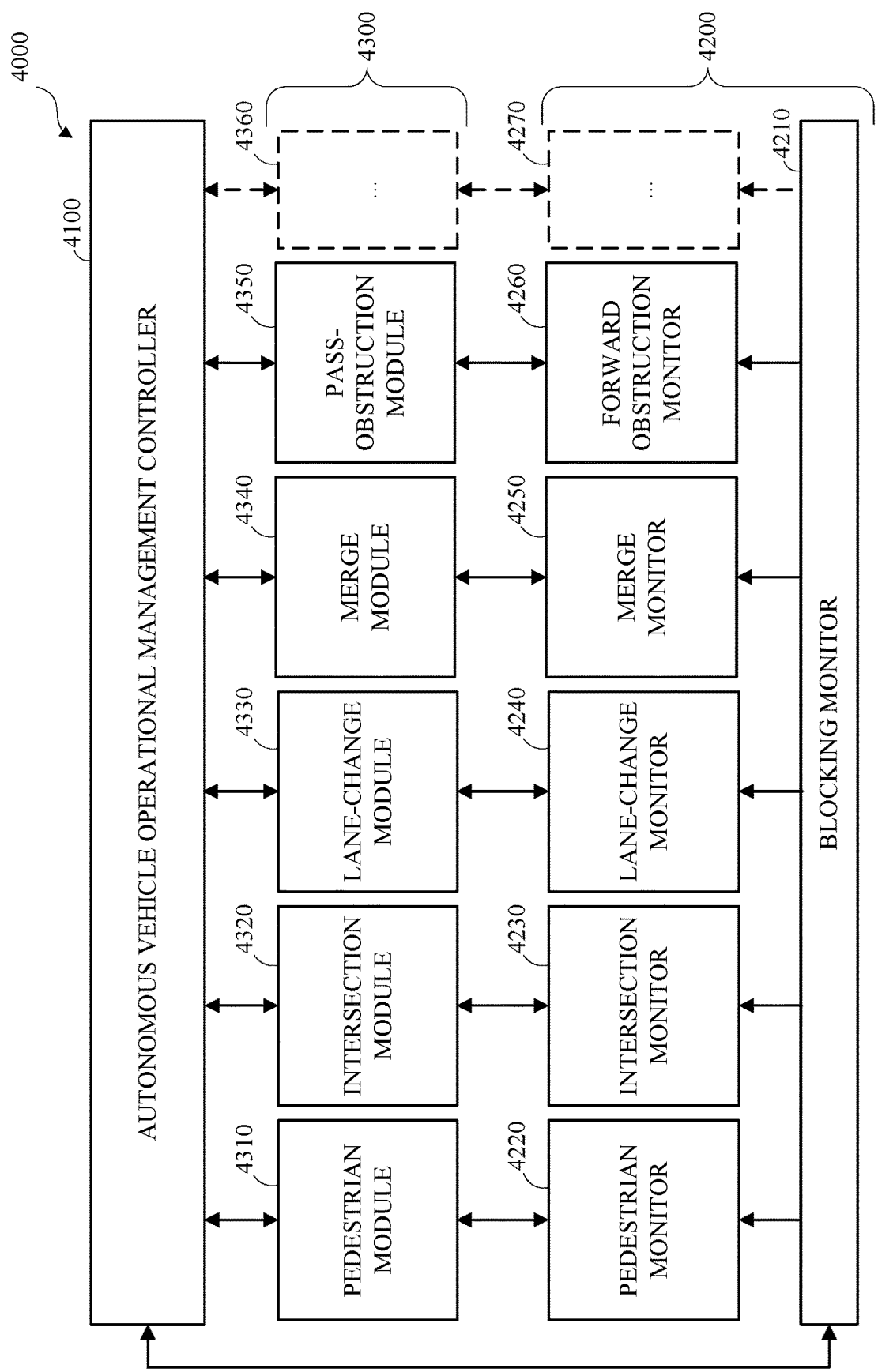
FIG. 4 is a diagram of an example of an autonomous vehicle operational management system in accordance with embodiments of this disclosure.

FIG. 4 is a diagram of an example of an autonomous vehicle operational management system 4000 in accordance with embodiments of this disclosure. The autonomous vehicle operational management system 4000 may be implemented in an autonomous vehicle, such as the vehicle 1000 shown in FIG. 1, one of the vehicles 2100/2110 shown in FIG. 2, a semi-autonomous vehicle, or any other vehicle implementing autonomous driving.

The autonomous vehicle may traverse a vehicle transportation network, or a portion thereof, which may include traversing distinct vehicle operational scenarios. A distinct vehicle operational scenario may include any distinctly identifiable set of operative conditions that may affect the operation of the autonomous vehicle within a defined spatiotemporal area, or operational environment, of the autonomous vehicle. For example, a distinct vehicle operational scenario may be based on a number or cardinality of roads, road segments, or lanes that the autonomous vehicle may traverse within a defined spatiotemporal distance. In another example, a distinct vehicle operational scenario may be based on one or more traffic control devices that may affect the operation of the autonomous vehicle within a defined spatiotemporal area, or operational environment, of the autonomous vehicle. In another example, a distinct vehicle operational scenario may be based on one or more identifiable rules, regulations, or laws that may affect the operation of the autonomous vehicle within a defined spatiotemporal area, or operational environment, of the autonomous vehicle. In another example, a distinct vehicle operational scenario may be based on one or more identifiable external objects that may affect the operation of the autonomous vehicle within a defined spatiotemporal area, or operational environment, of the autonomous vehicle.

For simplicity and clarity, similar vehicle operational scenarios may be described herein with reference to vehicle operational scenario types or classes. A type or class of a vehicle operation scenario may refer to a defined pattern or a defined set of patterns of the scenario. For example, intersection scenarios may include the autonomous vehicle traversing an intersection, pedestrian scenarios may include the autonomous vehicle traversing a portion of the vehicle transportation network that includes, or is within a defined proximity of, one or more pedestrians, such as wherein a pedestrian is crossing, or approaching, the expected path of the autonomous vehicle; lane-change scenarios may include the autonomous vehicle traversing a portion of the vehicle transportation network by changing lanes; merge scenarios may include the autonomous vehicle traversing a portion of the vehicle transportation network by merging from a first lane to a merged lane; pass-obstruction scenarios may include the autonomous vehicle traversing a portion of the vehicle transportation network by passing an obstacle or obstruction. Although pedestrian vehicle operational scenarios, intersection vehicle operational scenarios, lane-change vehicle operational scenarios, merge vehicle operational scenarios, and pass-obstruction vehicle operational scenarios are described herein, any other vehicle operational scenario or vehicle operational scenario type may be used.

As shown in FIG. 4, the autonomous vehicle operational management system 4000 includes an autonomous vehicle operational management controller 4100 (AVOMC), operational environment monitors 4200, and scenario-specific operation control evaluation modules 4300.

The AVOMC 4100, or another unit of the autonomous vehicle, may control the autonomous vehicle to traverse the vehicle transportation network, or a portion thereof. Controlling the autonomous vehicle to traverse the vehicle transportation network may include monitoring the operational environment of the autonomous vehicle, identifying or detecting distinct vehicle operational scenarios, identifying candidate vehicle control actions based on the distinct vehicle operational scenarios, controlling the autonomous vehicle to traverse a portion of the vehicle transportation network in accordance with one or more of the candidate vehicle control actions, or a combination thereof.

The AVOMC 4100 may receive, identify, or otherwise access, operational environment data representing an operational environment for the autonomous vehicle, or one or more aspects thereof. The operational environment of the autonomous vehicle may include a distinctly identifiable set of operative conditions that may affect the operation of the autonomous vehicle within a defined spatiotemporal area of the autonomous vehicle, within a defined spatiotemporal area of an identified route for the autonomous vehicle, or a combination thereof. For example, operative conditions that may affect the operation of the autonomous vehicle may be identified based on sensor data, vehicle transportation network data, route data, or any other data or combination of data representing a defined or determined operational environment for the vehicle.

The operational environment data may include vehicle information for the autonomous vehicle, such as information indicating a geospatial location of the autonomous vehicle, information correlating the geospatial location of the autonomous vehicle to information representing the vehicle transportation network, a route of the autonomous vehicle, a speed of the autonomous vehicle, an acceleration state of the autonomous vehicle, passenger information of the autonomous vehicle, or any other information about the autonomous vehicle or the operation of the autonomous vehicle. The operational environment data may include information representing the vehicle transportation network proximate to an identified route for the autonomous vehicle, such as within a defined spatial distance, such as 300 meters, of portions of the vehicle transportation network along the identified route, which may include information indicating the geometry of one or more aspects of the vehicle transportation network, information indicating a condition, such as a surface condition, of the vehicle transportation network, or any combination thereof. The operational environment data may include information representing the vehicle transportation network proximate to the autonomous vehicle, such as within a defined spatial distance of the autonomous vehicle, such as 300 meters, which may include information indicating the geometry of one or more aspects of the vehicle transportation network, information indicating a condition, such as a surface condition, of the vehicle transportation network, or any combination thereof. The operational environment data may include information representing external objects within the operational environment of the autonomous vehicle, such as information representing pedestrians, non-human animals, non-motorized transportation devices, such as bicycles or skateboards, motorized transportation devices, such as remote vehicles, or any other external object or entity that may affect the operation of the autonomous vehicle.

Aspects of the operational environment of the autonomous vehicle may be represented within respective distinct vehicle operational scenarios. For example, the relative orientation, trajectory, expected path, of external objects may be represented within respective distinct vehicle operational scenarios. In another example, the relative geometry of the vehicle transportation network may be represented within respective distinct vehicle operational scenarios.

As an example, a first distinct vehicle operational scenario may correspond to a pedestrian crossing a road at a crosswalk, and a relative orientation and expected path of the pedestrian, such as crossing from left to right for crossing from right to left, may be represented within the first distinct vehicle operational scenario. A second distinct vehicle operational scenario may correspond to a pedestrian crossing a road by jaywalking, and a relative orientation and expected path of the pedestrian, such as crossing from left to right for crossing from right to left, may be represented within the second distinct vehicle operational scenario.

The autonomous vehicle may traverse multiple distinct vehicle operational scenarios within an operational environment, which may be aspects of a compound vehicle operational scenario. The autonomous vehicle operational management system 4000 may operate or control the autonomous vehicle to traverse the distinct vehicle operational scenarios subject to defined constraints, such as safety constraints, legal constraints, physical constraints, user acceptability constraints, or any other constraint or combination of constraints that may be defined or derived for the operation of the autonomous vehicle.

The AVOMC 4100 may monitor the operational environment of the autonomous vehicle, or defined aspects thereof. Monitoring the operational environment of the autonomous vehicle may include identifying and tracking external objects, identifying distinct vehicle operational scenarios, or a combination thereof. For example, the AVOMC 4100 may identify and track external objects with the operational environment of the autonomous vehicle. Identifying and tracking the external objects may include identifying spatiotemporal locations of respective external objects, which may be relative to the autonomous vehicle, identifying one or more expected paths for respective external objects, which may include identifying a speed, a trajectory, or both, for an external object. For simplicity and clarity, descriptions of locations, expected locations, paths, expected paths, and the like herein may omit express indications that the corresponding locations and paths refer to geospatial and temporal components; however, unless expressly indicated herein, or otherwise unambiguously clear from context, the locations, expected locations, paths, expected paths, and the like described herein may include geospatial components, temporal components, or both. Monitor the operational environment of the autonomous vehicle may include using operational environment data received from the operational environment monitors 4200.

The operational environment monitors 4200 may include scenario-agnostic monitors, scenario-specific monitors, or a combination thereof. A scenario-agnostic monitor, such as a blocking monitor 4210, may monitor the operational environment of the autonomous vehicle, generate operational environment data representing aspects of the operational environment of the autonomous vehicle, and output the operational environment data to one or more scenario-specific monitor, the AVOMC 4100, or a combination thereof. A scenario-specific monitor, such as a pedestrian monitor 4220, an intersection monitor 4230, a lane-change monitor 4240, a merge monitor 4250, or a forward obstruction monitor 4260, may monitor the operational environment of the autonomous vehicle, generate operational environment data representing scenario-specific aspects of the operational environment of the autonomous vehicle, and output the operational environment data to one or more scenario-specific operation control evaluation modules 4300, the AVOMC 4100, or a combination thereof. For example, the pedestrian monitor 4220 may be an operational environment monitor for monitoring pedestrians, the intersection monitor 4230 may be an operational environment monitor for monitoring intersections, the lane-change monitor 4240 may be an operational environment monitor for monitoring lane-changes, the merge monitor 4250 may be an operational environment monitor for merges, and the forward obstruction monitor 4260 may be an operational environment monitor for monitoring forward obstructions. An operational environment monitor 4270 is shown using broken lines to indicate that the autonomous vehicle operational management system 4000 may include any number of operational environment monitors 4200.

An operational environment monitor 4200 may receive, or otherwise access, operational environment data, such as operational environment data generated or captured by one or more sensors of the autonomous vehicle, vehicle transportation network data, vehicle transportation network geometry data, route data, or a combination thereof. For example, the pedestrian monitor 4220 may receive, or otherwise access, information, such as sensor data, which may indicate, correspond to, or may otherwise be associated with, one or more pedestrians in the operational environment of the autonomous vehicle. An operational environment monitor 4200 may associate the operational environment data, or a portion thereof, with the operational environment, or an aspect thereof, such as with an external object, such as a pedestrian, a remote vehicle, or an aspect of the vehicle transportation network geometry.

An operational environment monitor 4200 may generate, or otherwise identify, information representing one or more aspects of the operational environment, such as with an external object, such as a pedestrian, a remote vehicle, or an aspect of the vehicle transportation network geometry, which may include filtering, abstracting, or otherwise processing the operational environment data. An operational environment monitor 4200 may output the information representing the one or more aspects of the operational environment to, or for access by, the AVOMC 4100, such by storing the information representing the one or more aspects of the operational environment in a memory, such as the memory 1340 shown in FIG. 1, of the autonomous vehicle accessible by the AVOMC 4100, sending the information representing the one or more aspects of the operational environment to the AVOMC 4100, or a combination thereof. An operational environment monitor 4200 may output the operational environment data to one or more elements of the autonomous vehicle operational management system 4000, such as the AVOMC 4100. Although not shown in FIG. 4, a scenario-specific operational environment monitor 4220, 4230, 4240, 4250, 4260 may output operational environment data to a scenario-agnostic operational environment monitor, such as the blocking monitor 4210.

The pedestrian monitor 4220 may correlate, associate, or otherwise process the operational environment data to identify, track, or predict actions of one or more pedestrians. For example, the pedestrian monitor 4220 may receive information, such as sensor data, from one or more sensors, which may correspond to one or more pedestrians, the pedestrian monitor 4220 may associate the sensor data with one or more identified pedestrians, which may include may identifying a direction of travel, a path, such as an expected path, a current or expected velocity, a current or expected acceleration rate, or a combination thereof for one or more of the respective identified pedestrians, and the pedestrian monitor 4220 may output the identified, associated, or generated pedestrian information to, or for access by, the AVOMC 4100.

The intersection monitor 4230 may correlate, associate, or otherwise process the operational environment data to identify, track, or predict actions of one or more remote vehicles in the operational environment of the autonomous vehicle, to identify an intersection, or an aspect thereof, in the operational environment of the autonomous vehicle, to identify vehicle transportation network geometry, or a combination thereof. For example, the intersection monitor 4230 may receive information, such as sensor data, from one or more sensors, which may correspond to one or more remote vehicles in the operational environment of the autonomous vehicle, the intersection, or one or more aspects thereof, in the operational environment of the autonomous vehicle, the vehicle transportation network geometry, or a combination thereof, the intersection monitor 4230 may associate the sensor data with one or more identified remote vehicles in the operational environment of the autonomous vehicle, the intersection, or one or more aspects thereof, in the operational environment of the autonomous vehicle, the vehicle transportation network geometry, or a combination thereof, which may include may identifying a current or expected direction of travel, a path, such as an expected path, a current or expected velocity, a current or expected acceleration rate, or a combination thereof for one or more of the respective identified remote vehicles, and intersection monitor 4230 may output the identified, associated, or generated intersection information to, or for access by, the AVOMC 4100.

The lane-change monitor 4240 may correlate, associate, or otherwise process the operational environment data to identify, track, or predict actions of one or more remote vehicles in the operational environment of the autonomous vehicle, such as information indicating a slow or stationary remote vehicle along the expected path of the autonomous vehicle, to identify one or more aspects of the operational environment of the autonomous vehicle, such as vehicle transportation network geometry in the operational environment of the autonomous vehicle, or a combination thereof geospatially corresponding to a lane-change operation. For example, the lane-change monitor 4240 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a lane-change operation, the lane-change monitor 4240 may associate the sensor data with one or more identified remote vehicles in the operational environment of the autonomous vehicle, one or more aspects of the operational environment of the autonomous vehicle or a combination thereof geospatially corresponding to a lane-change operation, which may include may identifying a current or expected direction of travel, a path, such as an expected path, a current or expected velocity, a current or expected acceleration rate, or a combination thereof for one or more of the respective identified remote vehicles, and the lane-change monitor 4240 may output the identified, associated, or generated lane-change information to, or for access by, the AVOMC 4100.

The merge monitor 4250 may correlate, associate, or otherwise process the operational environment data to identify, track, or predict actions of one or more remote vehicles in the operational environment of the autonomous vehicle, to identify one or more aspects of the operational environment of the autonomous vehicle, such as vehicle transportation network geometry in the operational environment of the autonomous vehicle, or a combination thereof geospatially corresponding to a merge operation. For example, the merge monitor 4250 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a merge operation, the merge monitor 4250 may associate the sensor data with one or more identified remote vehicles in the operational environment of the autonomous vehicle, one or more aspects of the operational environment of the autonomous vehicle or a combination thereof geospatially corresponding to a merge operation, which may include may identifying a current or expected direction of travel, a path, such as an expected path, a current or expected velocity, a current or expected acceleration rate, or a combination thereof for one or more of the respective identified remote vehicles, and the merge monitor 4250 may output the identified, associated, or generated merge information to, or for access by, the AVOMC 4100.

The forward obstruction monitor 4260 may correlate, associate, or otherwise process the operational environment data to identify one or more aspects of the operational environment of the autonomous vehicle geospatially corresponding to a forward pass-obstruction operation. For example, the forward obstruction monitor 4260 may identify vehicle transportation network geometry in the operational environment of the autonomous vehicle; the forward obstruction monitor 4260 may identify one or more obstructions or obstacles in the operational environment of the autonomous vehicle, such as a slow or stationary remote vehicle along the expected path of the autonomous vehicle or along an identified route for the autonomous vehicle; and the forward obstruction monitor 4260 may identify, track, or predict actions of one or more remote vehicles in the operational environment of the autonomous vehicle. The forward obstruction monitor 4250 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a forward pass-obstruction operation, the forward obstruction monitor 4250 may associate the sensor data with one or more identified remote vehicles in the operational environment of the autonomous vehicle, one or more aspects of the operational environment of the autonomous vehicle or a combination thereof geospatially corresponding to the forward pass-obstruction operation, which may include may identifying a current or expected direction of travel, a path, such as an expected path, a current or expected velocity, a current or expected acceleration rate, or a combination thereof for one or more of the respective identified remote vehicles, and the forward obstruction monitor 4250 may output the identified, associated, or generated forward obstruction information to, or for access by, the AVOMC 4100.

The blocking monitor 4210 may receive operational environment data representing an operational environment, or an aspect thereof, for the autonomous vehicle. The blocking monitor 4210 may determine a respective probability of availability, or corresponding blocking probability, for one or more portions of the vehicle transportation network, such as portions of the vehicle transportation network proximal to the autonomous vehicle, which may include portions of the vehicle transportation network corresponding to an expected path of the autonomous vehicle, such as an expected path identified based on a current route of the autonomous vehicle. A probability of availability, or corresponding blocking probability, may indicate a probability or likelihood that the autonomous vehicle may traverse a portion of, or spatial location within, the vehicle transportation network safely, such as unimpeded by an external object, such as a remote vehicle or a pedestrian. The blocking monitor 4210 may determine, or update, probabilities of availability continually or periodically. The blocking monitor 4210 may communicate probabilities of availability, or corresponding blocking probabilities, to the AVOMC 4100.

The AVOMC 4100 may identify one or more distinct vehicle operational scenarios based on one or more aspects of the operational environment represented by the operational environment data. For example, the AVOMC 4100 may identify a distinct vehicle operational scenario in response to identifying, or based on, the operational environment data indicated by one or more of the operational environment monitors 4200. The distinct vehicle operational scenario may be identified based on route data, sensor data, or a combination thereof. For example, the AVOMC 4100 may identifying one or multiple distinct vehicle operational scenarios corresponding to an identified route for the vehicle, such as based on map data corresponding to the identified route, in response to identifying the route. Multiple distinct vehicle operational scenarios may be identified based on one or more aspects of the operational environment represented by the operational environment data. For example, the operational environment data may include information representing a pedestrian approaching an intersection along an expected path for the autonomous vehicle, and the AVOMC 4100 may identify a pedestrian vehicle operational scenario, an intersection vehicle operational scenario, or both.

The AVOMC 4100 may instantiate respective instances of one or more of the scenario-specific operation control evaluation modules 4300 based on one or more aspects of the operational environment represented by the operational environment data. The scenario-specific operation control evaluation modules 4300 may include scenario-specific operation control evaluation modules (SSOCEMs), such as a pedestrian-SSOCEM 4310, an intersection-SSOCEM 4320, a lane-change-SSOCEM 4330, a merge-SSOCEM 4340, a pass-obstruction-SSOCEM 4350, or a combination thereof. A SSOCEM 4360 is shown using broken lines to indicate that the autonomous vehicle operational management system 4000 may include any number of SSOCEMs 4300. For example, the AVOMC 4100 may instantiate an instance of a SSOCEM 4300 in response to identifying a distinct vehicle operational scenario. The AVOMC 4100 may instantiate multiple instances of one or more SSOCEMs 4300 based on one or more aspects of the operational environment represented by the operational environment data. For example, the operational environment data may indicate two pedestrians in the operational environment of the autonomous vehicle and the AVOMC 4100 may instantiate a respective instance of the pedestrian-SSOCEM 4310 for each pedestrian based on one or more aspects of the operational environment represented by the operational environment data.

The AVOMC 4100 may transmit, send, or otherwise make available, such as by storing in a shared memory, the operational environment data, or one or more aspects thereof, to another unit of the autonomous vehicle, such as the blocking monitor 4210 or one or more instances of the SSOCEMs 4300. For example, the AVOMC 4100 may communicate the probabilities of availability, or corresponding blocking probabilities, received from the blocking monitor 4210 to respective instantiated instances of the SSOCEMs 4300. The AVOMC 4100 may store the operational environment data, or one or more aspects thereof, such as in a memory, such as the memory 1340 shown in FIG. 1, of the autonomous vehicle.

Controlling the autonomous vehicle to traverse the vehicle transportation network may include identifying candidate vehicle control actions based on the distinct vehicle operational scenarios, controlling the autonomous vehicle to traverse a portion of the vehicle transportation network in accordance with one or more of the candidate vehicle control actions, or a combination thereof. For example, the AVOMC 4100 may receive one or more candidate vehicle control actions from respective instances of the SSOCEMs 4300. The AVOMC 4100 may identify a vehicle control action from the candidate vehicle control actions, and may control the vehicle, or may provide the identified vehicle control action to another vehicle control unit, to traverse the vehicle transportation network in accordance with the vehicle control action.

A vehicle control action may indicate a vehicle control operation or maneuver, such as controlling a kinetic state of the vehicle, such as by accelerating, decelerating, or stopping the vehicle, controlling a directional state of the vehicle, such as by steering or turning stopping the vehicle, or any other vehicle operation or combination of vehicle operations that may be performed by the autonomous vehicle in conjunction with traversing a portion of the vehicle transportation network.

For example, a 'stop' vehicle control action may include controlling the vehicle to traverse the vehicle transportation network, or a portion thereof, by controlling a kinetic control unit, a trajectory control unit, or a combination of control units, to stop the vehicle or otherwise control the vehicle to become or remain stationary; a 'Yield' vehicle control action may include controlling the vehicle to traverse the vehicle transportation network, or a portion thereof, by controlling a kinetic control unit, a trajectory control unit, or a combination of control units, to slow the vehicle or otherwise control the vehicle to move at a speed within a defined threshold or range, which may be lower than or within a defined statutory speed limit; an 'orientation-adjust' vehicle control action may include controlling the vehicle to traverse the vehicle transportation network, or a portion thereof, by controlling a kinetic control unit, a trajectory control unit, or a combination of control units, to alter the orientation of the vehicle relative occlusions, external objects, or both, within defined right-of-way parameters; an 'accelerate' vehicle control action may include controlling the vehicle to traverse the vehicle transportation network, or a portion thereof, by controlling a kinetic control unit, a trajectory control unit, or a combination of control units, to accelerate at a defined acceleration rate, or at an acceleration rate within a defined range; a 'decelerate' vehicle control action may include controlling the vehicle to traverse the vehicle transportation network, or a portion thereof, by controlling a kinetic control unit, a trajectory control unit, or a combination of control units, to decelerate a defined deceleration rate, or at a deceleration rate within a defined range; a 'maintain' vehicle control action may include controlling the vehicle to traverse the vehicle transportation network, or a portion thereof, by controlling a kinetic control unit, a trajectory control unit, or a combination of control units, to maintain current operational parameters, such as by maintaining a current velocity, a current path or route, or a current lane orientation; and a 'proceed' vehicle control action may include controlling the vehicle to traverse the vehicle transportation network, or a portion thereof, by controlling a kinetic control unit, a trajectory control unit, or a combination of control units, to begin or resume a previously identified set of operational parameters. Although some vehicle control actions are described herein, other vehicle control actions may be used.

A vehicle control action may include one or more performance metrics. For example, a 'stop' vehicle control action may include a deceleration rate as a performance metric. In another example, a 'proceed' vehicle control action may expressly indicate route or path information, speed information, an acceleration rate, or a combination thereof as performance metrics, or may expressly or implicitly indicate that a current or previously identified path, speed, acceleration rate, or a combination thereof may be maintained. A vehicle control action may be a compound vehicle control action, which may include a sequence, combination, or both of vehicle control actions. For example, an 'orientation-adjust' vehicle control action may indicate a 'stop' vehicle control action, a subsequent 'accelerate' vehicle control action associated with a defined acceleration rate, and a subsequent 'stop' vehicle control action associated with a defined deceleration rate, such that controlling the autonomous vehicle in accordance with the 'orientation-adjust' vehicle control action includes controlling the autonomous vehicle to slowly inch forward a short distance, such as a few inches or a foot.

The AVOMC 4100 may uninstantiate an instance of a SSOCEM 4300. For example, the AVOMC 4100 may identify a distinct set of operative conditions as indicating a distinct vehicle operational scenario for the autonomous vehicle, instantiate an instance of a SSOCEM 4300 for the distinct vehicle operational scenario, monitor the operative conditions, subsequently determine that one or more of the operative conditions has expired, or has a probability of affecting the operation of the autonomous vehicle below a defined threshold, and the AVOMC 4100 may uninstantiate the instance of the SSOCEM 4300.

The AVOMC 4100 may instantiate and uninstantiate instances of SSOCEMs 4300 based on one or more vehicle operational management control metrics, such as an immanency metric, an urgency metric, a utility metric, an acceptability metric, or a combination thereof. An immanency metric may indicate, represent, or be based on, a spatial, temporal, or spatiotemporal distance or proximity, which may be an expected distance or proximity, for the vehicle to traverse the vehicle transportation network from a current location of the vehicle to a portion of the vehicle transportation network corresponding to a respective identified vehicle operational scenario. An urgency metric may indicate, represent, or be based on, a measure of the spatial, temporal, or spatiotemporal distance available for controlling the vehicle to traverse a portion of the vehicle transportation network corresponding to a respective identified vehicle operational scenario. A utility metric may indicate, represent, or be based on, an expected value of instantiating an instance of a SSOCEM 4300 corresponding to a respective identified vehicle operational scenario. An acceptability metric may be a safety metric, such a metric indicating collision avoidance, a vehicle transportation network control compliance metric, such as a metric indicating compliance with vehicle transportation network rules and regulations, a physical capability metric, such as a metric indicating a maximum braking capability of the vehicle, a user defined metric, such as a user preference. Other metrics, or combinations of metrics may be used. A vehicle operational management control metric may indicate a defined rate, range, or limit. For example, an acceptability metric may indicate a defined target rate of deceleration, a defined range of deceleration rates, or a defined maximum rate of deceleration.

A SSOCEM 4300 may include one or more models of a respective distinct vehicle operational scenario. The autonomous vehicle operational management system 4000 may include any number of SSOCEMs 4300, each including models of a respective distinct vehicle operational scenario. A SSOCEM 4300 may include one or more models from one or more types of models. For example, a SSOCEM 4300 may include a Partially Observable Markov Decision Process (POMDP) model, a Markov Decision Process (MDP) model, a Classical Planning model, a Partially Observable Stochastic Game (POSG) model, a Decentralized Partially Observable Markov Decision Process (Dec-POMDP) model, a Reinforcement Learning (RL) model, an artificial neural network model, or any other model of a respective distinct vehicle operational scenario. Each different type of model may have respective characteristics for accuracy and resource utilization. For example, a POMDP model for a defined scenario may have greater accuracy and greater resource utilization than an MDP model for the defined scenario. The models included in a SSOCEM 4300 may be ordered, such as hierarchically, such as based on accuracy. For example, a designated model, such as the most accurate model included in an SSOCEM 4300, may be identified as the primary model for the SSOCEM 4300 and other models included in the SSOCEM 4300 may be identified as secondary models.

In an example, one or more of the SSOCEMs 4300 may include a POMDP model, which may be a single-agent model. A POMDP model may model a distinct vehicle operational scenario, which may include modeling uncertainty, using a set of states (S), a set of actions (A), a set of observations ($\Omega$), a set of state transition probabilities (T), a set of conditional observation probabilities (O), a reward function (R), or a combination thereof. A POMDP model may be defined or described as a tuple <S, A, $\Omega$, T, O, R>.

A state from the set of states (S), may represent a distinct condition of respective defined aspects, such as external objects and traffic control devices, of the operational environment of the autonomous vehicle that may probabilistically affect the operation of the autonomous vehicle at a discrete temporal location. A respective set of states (S) may be defined for each distinct vehicle operational scenario. Each state (state space), from a set of states (S) may include one or more defined state factors. Although some examples of state factors for some models are described herein, a model, including any model described herein, may include any number, or cardinality, of state factors. Each state factor may represent a defined aspect of the respective scenario and may have a respective defined set of values. Although some examples of state factor values for some state factors are described herein, a state factor, including any state factor described herein, may include any number, or cardinality, of values.

An action from the set of actions (A) may indicate an available vehicle control action at each state in the set of states (S). A respective set of actions may be defined for each distinct vehicle operational scenario. Each action (action space), from a set of actions (A) may include one or more defined action factors. Although some examples of action factors for some models are described herein, a model, including any model described herein, may include any number, or cardinality, of action factors. Each action factor may represent an available vehicle control action and may have a respective defined set of values. Although some examples of action factor values for some action factors are described herein, an action factor, including any action factor described herein, may include any number, or cardinality, of values.

An observation from the set of observations ($\Omega$) may indicate available observable, measurable, or determinable data for each state from the set of states (S). A respective set of observations may be defined for each distinct vehicle operational scenario. Each observation (observation space), from a set of observations ($\Omega$) may include one or more defined observation factors. Although some examples of observation factors for some models are described herein, a model, including any model described herein, may include any number, or cardinality, of observation factors. Each observations factor may represent available observations and may have a respective defined set of values. Although some examples of observation factor values for some observation factors are described herein, an observation factor, including any observation factor described herein, may include any number, or cardinality, of values.

A state transition probability from the set of state transition probabilities (T) may probabilistically represent changes to the operational environment of the autonomous vehicle, as represented by the set of states (S), responsive to the actions of the autonomous vehicle, as represented by the set of actions (A), which may be expressed as T: S×A×S→ [0, 1]. A respective set of state transition probabilities (T) may be defined for each distinct vehicle operational scenario. Although some examples of state transition probabilities for some models are described herein, a model, including any model described herein, may include any number, or cardinality, of state transition probabilities. For example, each combination of a state, an action, and a subsequent state may be associated with a respective state transition probability.

A conditional observation probability from the set of conditional observation probabilities (O) may represent probabilities of making respective observations ($\Omega$) based on the operational environment of the autonomous vehicle, as represented by the set of states (S), responsive to the actions of the autonomous vehicle, as represented by the set of actions (A), which may be represented as O: A×S×$\Omega$→[0, 1]. A respective set of conditional observation probabilities (O) may be defined for each distinct vehicle operational scenario. Although some examples of state conditional observation probabilities for some models are described herein, a model, including any model described herein, may include any number, or cardinality, of conditional observation probabilities. For example, each combination of an action, a subsequent state, and an observation may be associated with a respective conditional observation probability.

The reward function (R) may determine a respective positive or negative (cost) value that may be accrued for each combination of state and action, which may represent an expected value of the autonomous vehicle traversing the vehicle transportation network from the corresponding state in accordance with the corresponding vehicle control action to the subsequent state, which may be expressed as R: S×A→R.

For simplicity and clarity, the examples of values of a model, such as state factor values or observation factor values, described herein include categorical representations, such as {start, goal} or {short, long}. The categorical values may represent defined discrete values, which may be relative values. For example, a state factor representing a temporal aspect may have values from the set {short, long}; the value 'short' may represent discrete values, such as a temporal distance, within, or less than, a defined threshold, such as three seconds, and the value 'long' may represent discrete values, such as a temporal distance, of at least, such as equal to or greater than, the defined threshold. Defined thresholds for respective categorical values may be defined relative to associated factors. For example, a defined threshold for the set {short, long} for a temporal factor may be associated with a relative spatial location factor value and another defined threshold for the set {short, long} for the temporal factor may be associated with another relative spatial location factor value. Although categorical representations of factor values are described herein, other representations, or combinations of representations, may be used. For example, a set of temporal state factor values may be {short (representing values of less than three seconds), 4, 5, 6, long (representing values of at least 7 seconds)}.

In some embodiments, such as embodiments implementing a POMDP model, modeling an autonomous vehicle operational control scenario may include modeling occlusions. For example, the operational environment data may include information corresponding to one or more occlusions, such as sensor occlusions, in the operational environment of the autonomous vehicle such that the operational environment data may omit information representing one or more occluded external objects in the operational environment of the autonomous vehicle. For example, an occlusion may be an external object, such as a traffic signs, a building, a tree, an identified external object, or any other operational condition or combination of operational conditions capable of occluding one or more other operational conditions, such as external objects, from the autonomous vehicle at a defined spatiotemporal location. In some embodiments, an operational environment monitor 4200 may identify occlusions, may identify or determine a probability that an external object is occluded, or hidden, by an identified occlusion, and may include occluded vehicle probability information in the operational environment data output to the AVOMC 4100, and communicated, by the AVOMC 4100, to the respective SSOCEMs 4300.

The autonomous vehicle operational management system 4000 may include any number or combination of types of models. For example, the pedestrian-SSOCEM 4310, the intersection-SSOCEM 4320, the lane-change-SSOCEM 4330, the merge-SSOCEM 4340, and the pass-obstruction-SSOCEM 4350 may be POMDP models. In another example, the pedestrian-SSOCEM 4310 may be a MDP model and the intersection-SSOCEM 4320 may be a POMDP model. The AVOMC 4100 may instantiate any number of instances of the SSOCEMs 4300 based on the operational environment data.

Instantiating a SSOCEM 4300 instance may include identifying a model from the SSOCEM 4300 and instantiating an instance of the identified model. For example, a SSOCEM 4300 may include a primary model and a secondary model for a respective distinct vehicle operational scenario and instantiating the SSOCEM 4300 may include identifying the primary model as a current model and instantiating an instance of the primary model. Instantiating a model may include determining whether a solution or policy is available for the model. Instantiating a model may include determining whether an available solution or policy for the model is partially solved or is convergent and solved. Instantiating a SSOCEM 4300 may include instantiating an instance of a solution or policy for the identified model for the SSOCEM 4300.

Solving a model, such as a POMDP model, may include determining a policy or solution, which may be a function, that maximizes an accrued reward, which may be determined by evaluating the possible combinations of the elements of the tuple, such as <S, A, $\Omega$, T, O, R>, that defines the model. A policy or solution may identify or output a reward maximized, or optimal, candidate vehicle control action based on identified belief state data. The identified belief state data, which may be probabilistic, may indicate current state data, such as a current set of state values for the respective model, or a probability for the current set of state values, and may correspond with a respective relative temporal location. For example, solving a MDP model may include identifying a state from the set of states (S), identifying an action from the set of action (A), determining a subsequent, or successor, state from the set of states (S) subsequent to simulating the action subject to the state transition probabilities. Each state may be associated with a corresponding utility value and solving the MDP model may include determining respective utility values corresponding to each possible combination of state, action, and subsequent state. The utility value of the subsequent state may be identified as the maximum identified utility value subject to a reward, or penalty, which may be a discounted reward, or penalty. The policy may indicate an action corresponding to the maximum utility value for a respective state. Solving a POMDP model may be similar to solving the MDP model, except based on belief states, representing probabilities for respective states and subject to observation probabilities corresponding generating observations for respective states. Thus, solving the SSOCEM model includes evaluating the possible state-action-state transitions and updating respective belief states, such as using Bayes rule, based on respective actions and observations.

Figure 5:
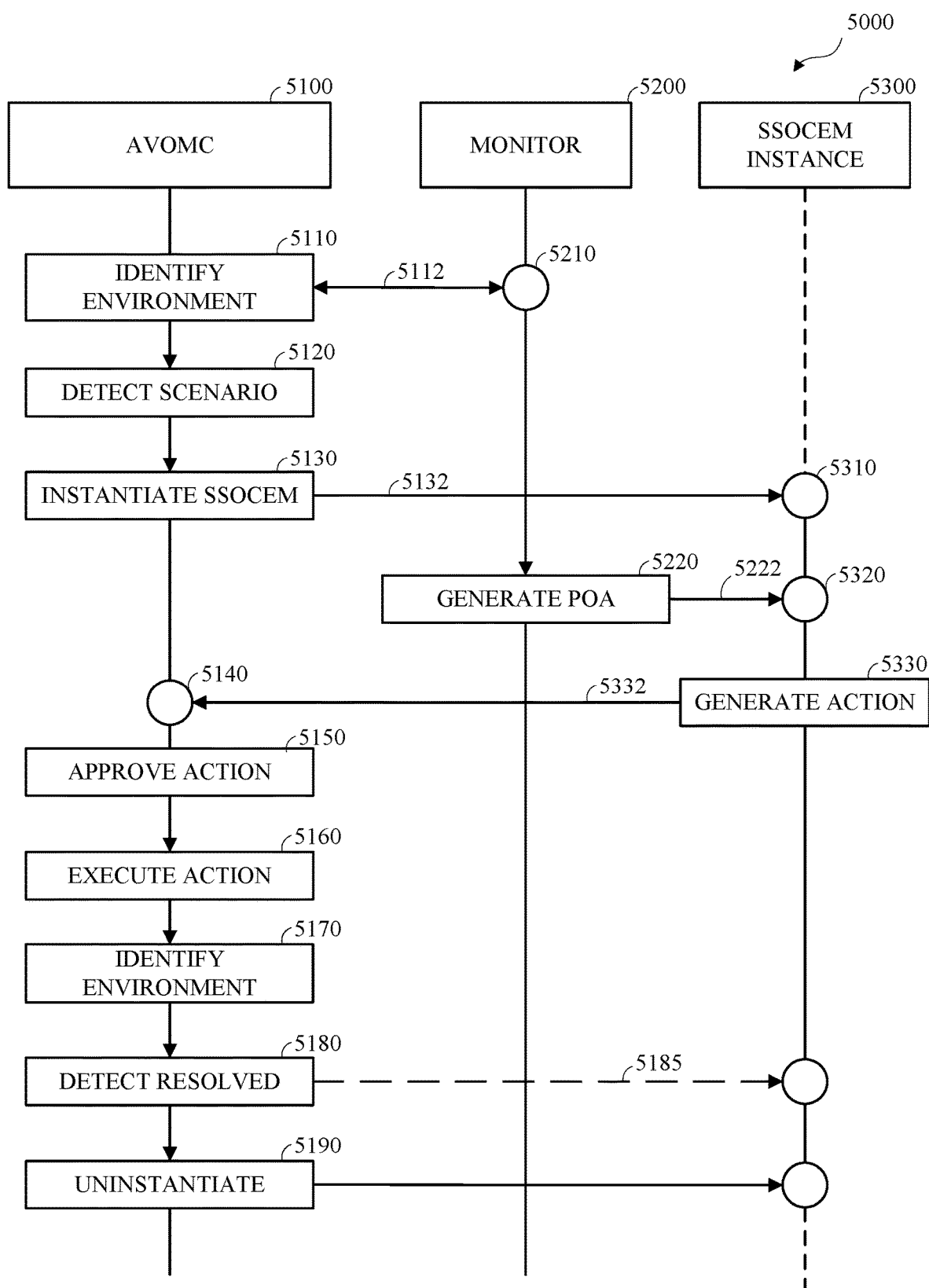
FIG. 5 is a flow diagram of an example of an autonomous vehicle operational management in accordance with embodiments of this disclosure.

FIG. 5 is a flow diagram of an example of autonomous vehicle operational management 5000 in accordance with embodiments of this disclosure. Autonomous vehicle operational management 5000 may be implemented in an autonomous vehicle, such as the vehicle 1000 shown in FIG. 1, one of the vehicles 2100/2110 shown in FIG. 2, a semi-autonomous vehicle, or any other vehicle implementing autonomous driving. For example, an autonomous vehicle may implement an autonomous vehicle operational management system, such as the autonomous vehicle operational management system 4000 shown in FIG. 4.

As shown in FIG. 5, autonomous vehicle operational management 5000 includes implementing or operating the autonomous vehicle operational management system, including one or more modules or components thereof, which may include operating an autonomous vehicle operational management controller (AVOMC) 5100, such as the AVOMC 4100 shown in FIG. 4; operating operational environment monitors 5200, such as one or more of the operational environment monitors 4220, 4230, 4240, 4250, 4260, 4270 shown in FIG. 4; and operating a scenario-specific operational control evaluation module instance (SSOCEM instance) 5300, such as an instance of a SSOCEM 4300 shown in FIG. 4.

The AVOMC 5100 may monitor the operational environment of the autonomous vehicle, or defined aspects thereof, at 5110 to identify an operational environment, or an aspect thereof, of the autonomous vehicle. For example, operational environment monitors 5200 may monitor scenario-specific aspects of the operational environment and may transmit, send, or otherwise make available, such as by storing in a shared memory, operational environment data representing the operational environment to the AVOMC 5100. Monitoring the operational environment of the autonomous vehicle may include identifying and tracking external objects at 5110, identifying distinct vehicle operational scenarios at 5120, or a combination thereof. For example, the AVOMC 5100, the operational environment monitors 5200, or both, may identify the operational environment data based on sensor data, vehicle data, route data, vehicle transportation network data, previously identified operational environment data, or any other available data, or combination of data, describing an aspect or aspects of the operational environment.

Identifying the operational environment may include identifying operational environment data representing the operational environment, or one or more aspects thereof. The operational environment data may include vehicle information for the autonomous vehicle, information representing the vehicle transportation network, or one or more aspects thereof, proximate to the autonomous vehicle, information representing external objects, or one or more aspects thereof, within the operational environment of the autonomous vehicle, along or proximate to a route identified for the autonomous vehicle, or a combination thereof. The sensor information may be processed sensor information, such as processed sensor information from a sensor information processing unit of the autonomous vehicle, which may receive sensor information from the sensor of the autonomous vehicle and may generate the processed sensor information based on the sensor information.

Identifying the operational environment data may include receiving information indicating one or more aspects of the operational environment from a sensor of the autonomous vehicle, such as the sensor 1360 shown in FIG. 1 or the on-vehicle sensors 2105 shown in FIG. 2. The sensor, or another unit of the autonomous vehicle, may store the sensor information in a memory, such as the memory 1340 shown in FIG. 1, of the autonomous vehicle and the AVOMC 5100 reading the sensor information from the memory.

Identifying the operational environment data may include identifying information indicating one or more aspects of the operational environment from vehicle transportation network data. For example, the AVOMC 5100 may read, or otherwise receive, vehicle transportation network data indicating that the autonomous vehicle is approaching an intersection, or otherwise describing a geometry or configuration of the vehicle transportation network proximate to the autonomous vehicle, such as within 300 meters of the autonomous vehicle.

Identifying the operational environment data at 5110 may include identifying information indicating one or more aspects of the operational environment from a remote vehicle or other remote device external to the autonomous vehicle. For example, the autonomous vehicle may receive, from a remote vehicle, via a wireless electronic communication link, a remote vehicle message including remote vehicle information indicating remote vehicle geospatial state information for the remote vehicle, remote vehicle kinematic state information for the remote vehicle, or both.

Identifying the operational environment data may include identifying information indicating one or more aspects of the operational environment from route data representing an identified route for the autonomous vehicle. For example, the AVOMC 5100 may read, or otherwise receive, vehicle transportation network data representing an identified route, such as a route identified in response to user input, for the autonomous vehicle.

The AVOMC 5100 and the operational environment monitors 5200 may communicate to identify the operational environment data as indicated at 5110, 5112, and 5210. Alternatively, or in addition, the operational environment monitors 5200 may receive the operational environment data from another component of the autonomous vehicle, such as from a sensor of the autonomous vehicle or from another operational environment monitor 5200, or the operational environment monitors 5200 may read the operational environment data from a memory of the autonomous vehicle.

The AVOMC 5100 may detect or identify one or more distinct vehicle operational scenarios at 5120, such as based on one or more aspects of the operational environment represented by the operational environment data identified at 5110.

The AVOMC 5100 may instantiate a SSOCEM instance 5300 based on one or more aspects of the operational environment represented by the operational environment data at 5130, such as in response to identifying a distinct vehicle operational scenario at 5120. Although one SSOCEM instance 5300 is shown in FIG. 5, the AVOMC 5100 may instantiate multiple SSOCEM instances 5300 based on one or more aspects of the operational environment represented by the operational environment data identified at 5110, each SSOCEM instance 5300 corresponding to a respective distinct vehicle operational scenario detected at 5120, or a combination of a distinct external object identified at 5110 and a respective distinct vehicle operational scenario detected at 5120. Instantiating a SSOCEM instance 5300 at 5130 may include sending the operational environment data representing an operational environment for the autonomous vehicle to the SSOCEM instance 5300 as indicated at 5132. The SSOCEM instance 5300 may receive the operational environment data representing an operational environment for the autonomous vehicle, or one or more aspects thereof, at 5310. Instantiating a SSOCEM instance 5300 at 5130 may include identifying a model, such as a primary model or a secondary model, of the distinct vehicle operational scenario, instantiating an instance of the model, identifying a solution or policy corresponding to the model, instantiating an instance of the solution or policy, or a combination thereof.

The operational environment monitors 5200 may include a blocking monitor, such as the blocking monitor 4210 shown in FIG. 4, which may determine a respective probability of availability (POA), or corresponding blocking probability, at 5220 for one or more portions of the vehicle transportation network, such as portions of the vehicle transportation network proximal to the autonomous vehicle, which may include portions of the vehicle transportation network corresponding to an expected path of the autonomous vehicle, such as an expected path identified based on a current route of the autonomous vehicle. The blocking monitor may transmit, send, or otherwise make available, such as by storing in a shared memory, the probabilities of availability identified at 5220 to the SSOCEM instance 5300 at 5222. Alternatively, or in addition, the blocking monitor may store the probabilities of availability identified at 5220 in a memory of the autonomous vehicle. Although not expressly shown in FIG. 5, the blocking monitor may transmit, send, or otherwise make available, such as by storing in a shared memory, the probabilities of availability identified at 5220 to the AVOMC 5100 at 5222 in addition to, or in alternative to, sending the probabilities of availability to the SSOCEM instance 5300. The SSOCEM instance 5300 may receive the probabilities of availability at 5320.

The SSOCEM instance 5300 may generate or identify a candidate vehicle control action at 5330. For example, the SSOCEM instance 5300 may generate or identify the candidate vehicle control action at 5330 in response to receiving the operational environment data 5310, receiving the probability of availability data at 5320, or both. For example, the instance of the solution or policy instantiated at 5310 for the model of the distinct vehicle operational scenario may output the candidate vehicle control action based on the operational environment data, the probability of availability data, or both. The SSOCEM instance 5300 may transmit, send, or otherwise make available, such as by storing in a shared memory, the candidate vehicle control action identified at 5330 to the AVOMC 5100 at 5332. Alternatively, or in addition, the SSOCEM instance 5300 may store the candidate vehicle control action identified at 5330 in a memory of the autonomous vehicle.

The AVOMC 5100 may receive a candidate vehicle control action at 5140. For example, the AVOMC 5100 may receive the candidate vehicle control action from the SSOCEM instance 5300 at 5140. Alternatively, or in addition, the AVOMC 5100 may read the candidate vehicle control action from a memory of the autonomous vehicle.

The AVOMC 5100 may approve the candidate vehicle control action, or otherwise identify the candidate vehicle control action as a vehicle control action for controlling the autonomous vehicle to traverse the vehicle transportation network, at 5150. Approving a candidate vehicle control action at 5150 may include determining whether to traverse a portion of the vehicle transportation network in accordance with the candidate vehicle control action.

The AVOMC 5100 may control, or may provide the identified vehicle control action to another vehicle control unit, the autonomous vehicle to traverse the vehicle transportation network, or a portion thereof, at 5160 in accordance with the vehicle control action identified at 5150.

The AVOMC 5100 may identify an operational environment, or an aspect thereof, of the autonomous vehicle at 5170. Identifying an operational environment, or an aspect thereof, of the autonomous vehicle at 5170 may be similar to identifying the operational environment of the autonomous vehicle at 5110 and may include updating previously identified operational environment data.

The AVOMC 5100 may determine or detect whether a distinct vehicle operational scenario is resolved or unresolved at 5180. For example, the AVOMC 5100 may receive operation environment information continuously or on a periodic basis, as described above. The AVOMC 5100 may evaluate the operational environment data to determine whether the distinct vehicle operational scenario has resolved.

The AVOMC 5100 may determine that the distinct vehicle operational scenario corresponding to the SSOCEM instance 5300 is unresolved at 5180, the AVOMC 5100 may transmit, send, or otherwise make available, such as by storing in a shared memory, the operational environment data identified at 5170 to the SSOCEM instances 5300 as indicated at 5185, and uninstantiating the SSOCEM instance 5300 at 5180 may be omitted or differed.

The AVOMC 5100 may determine that the distinct vehicle operational scenario is resolved at 5180 and may uninstantiate at 5190 the SSOCEM instances 5300 corresponding to the distinct vehicle operational scenario determined to be resolved at 5180. For example, the AVOMC 5100 may identify a distinct set of operative conditions forming the distinct vehicle operational scenario for the autonomous vehicle at 5120, may determine that one or more of the operative conditions has expired, or has a probability of affecting the operation of the autonomous vehicle below a defined threshold at 5180, and may uninstantiate the corresponding SSOCEM instance 5300.

Although not expressly shown in FIG. 5, the AVOMC 5100 may continuously or periodically repeat identifying or updating the operational environment data at 5170, determining whether the distinct vehicle operational scenario is resolved at 5180, and, in response to determining that the distinct vehicle operational scenario is unresolved at 5180, sending the operational environment data identified at 5170 to the SSOCEM instances 5300 as indicated at 5185, until determining whether the distinct vehicle operational scenario is resolved at 5180 includes determining that the distinct vehicle operational scenario is resolved.

Figure 6:
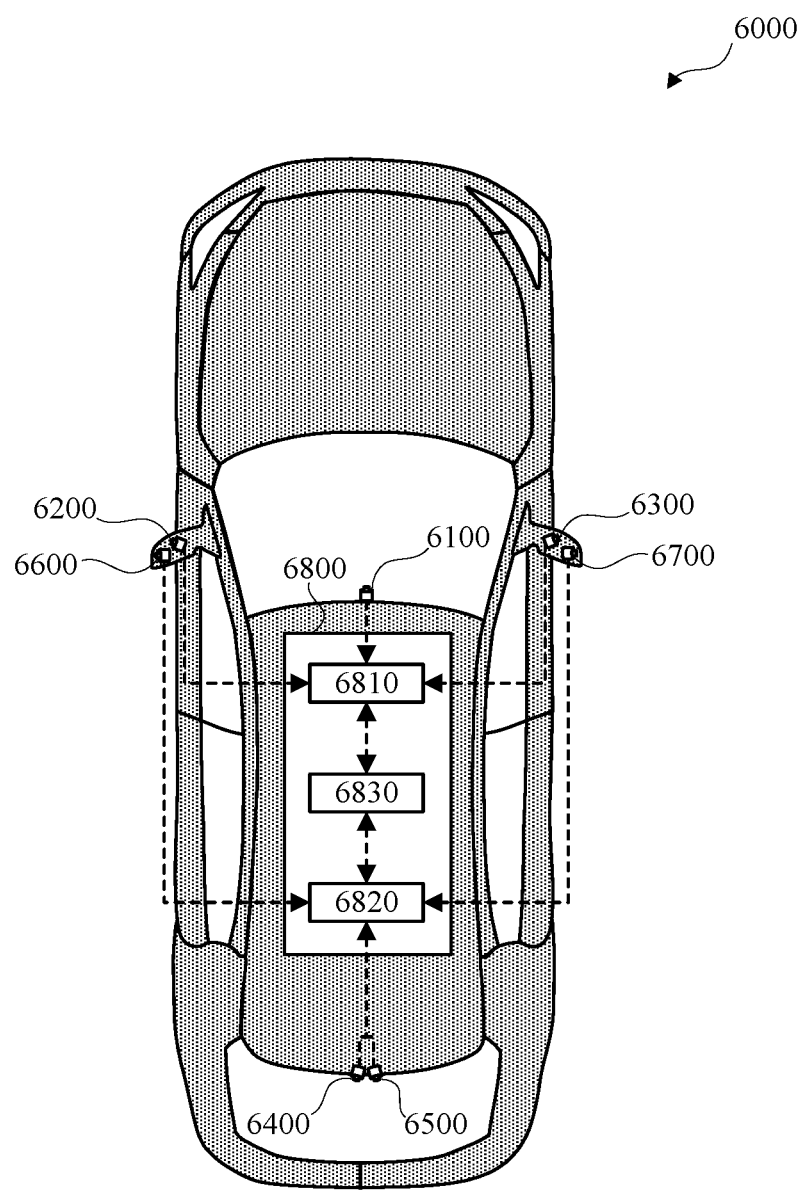
FIG. 6 is a diagram of an example of a vehicle in accordance with embodiments of this disclosure.

FIG. 6 is a diagram of an example of a vehicle 6000 in accordance with embodiments of this disclosure. The vehicle 6000 may be an autonomous vehicle, such as the vehicle 1000 shown in FIG. 1, one of the vehicles 2100/2110 shown in FIG. 2, a semi-autonomous vehicle, or any other vehicle implementing autonomous driving. As shown in FIG. 6, the vehicle 6000 includes image capture units 6100-6700, which may be sensors, such as the sensor 1360 shown in FIG. 1. Although FIG. 6 shows seven image capture units 6100-6700, any number of image capture units, or other sensors, may be used. The vehicle 6000 includes a perception unit 6800. For simplicity and clarity, FIG. 6 is oriented with north at the top and east at the right. For simplicity and clarity, in FIG. 6 east, to the right, is described as corresponding to an angle of zero degrees such that the vehicle 6000 is oriented in alignment with north corresponding to an angle of ninety degrees.

Figure 7:
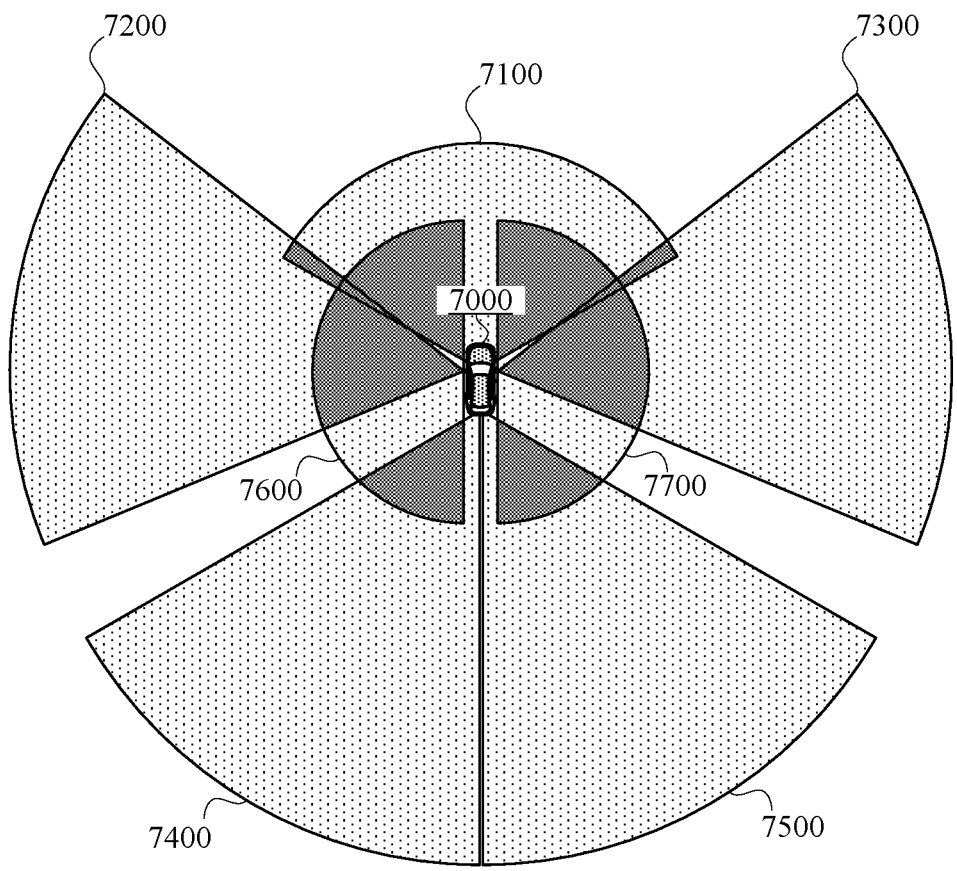
FIG. 7 is a diagram of an example of fields of view for sensors of a vehicle in accordance with embodiments of this disclosure.

Each of the image capture units 6100-6700 may have a relative orientation and a field of view. The relative orientation is the orientation of each image capture unit 6100-6700 with respect to the vehicle 6000. Although not shown in FIG. 6, the relative orientation of an image capture unit may be adjustable, such as mechanically or electronically. The field of view describes the area of the scene captured by an image capture unit. Although a conical field of view is described generally herein, other field of views configurations may be used. Examples of fields of view are shown in FIG. 7.

As shown in FIG. 6, the vehicle 6000 includes a center-forward image capture unit 6100 (first image capture unit), a left-forward image capture unit 6200 (second image capture unit), a right-forward image capture unit 6300 (third image capture unit), a left-rear image capture unit 6400 (fourth image capture unit), a right-rear image capture unit 6500 (fifth image capture unit), a left-side image capture unit 6600 (sixth image capture unit), and a right-side image capture unit 6700 (seventh image capture unit). Other image capture units and orientations thereof may be used.

The center-forward image capture unit 6100 may have a relative orientation, which may correspond with an optical axis of the field of view (not expressly shown) of the center-forward image capture unit 6100. The relative orientation of the center-forward image capture unit 6100 may be horizontally aligned with the vehicle 6000, at ninety degrees as shown. The relative orientation of the center-forward image capture unit 6100 may be vertically aligned with the horizon (not shown). Other relative orientation may be used.

The left-forward image capture unit 6200 may have a relative orientation, which may correspond with an optical axis of the field of view (not expressly shown) of the left-forward image capture unit 6200. The relative orientation of the left-forward image capture unit 6200 may be horizontally aligned to the left-front of the vehicle 6000, such as at 167.5 degrees as shown. The relative orientation of the left-forward image capture unit 6200 may be vertically aligned with the horizon (not shown). Other relative orientation may be used.

The right-forward image capture unit 6300 may have a relative orientation, which may correspond with an optical axis of the field of view (not expressly shown) of the right-forward image capture unit 6300. The relative orientation of the right-forward image capture unit 6300 may be horizontally aligned to the right-front of the vehicle 6000, such as at 12.5 degrees as shown. The relative orientation of the right-forward image capture unit 6300 may be vertically aligned with the horizon (not shown). Other relative orientation may be used.

The left-rear image capture unit 6400 may have a relative orientation, which may correspond with an optical axis of the field of view (not expressly shown) of the left-rear image capture unit 6400. The relative orientation of the left-rear image capture unit 6400 may be horizontally aligned to the left-rear of the vehicle 6000, such as at 240 degrees as shown. The relative orientation of the left-rear image capture unit 6400 may be vertically aligned with the horizon (not shown). Other relative orientation may be used.

The right-rear image capture unit 6500 may have a relative orientation, which may correspond with an optical axis of the field of view (not expressly shown) of the right-rear image capture unit 6500. The relative orientation of the right-rear image capture unit 6500 may be horizontally aligned to the right-rear of the vehicle 6000, such as at 300 degrees as shown. The relative orientation of the right-rear image capture unit 6500 may be vertically aligned with the horizon (not shown). Other relative orientation may be used.

The left-side image capture unit 6600 may have a relative orientation, which may correspond with an optical axis of the field of view (not expressly shown) of the left-side image capture unit 6600. The relative orientation of the left-side image capture unit 6600 may be horizontally aligned to the left of the vehicle 6000, such as at 180 degrees as shown. The relative orientation of the left-side image capture unit 6600 may be vertically aligned with the horizon (not shown). Other relative orientation may be used.

The right-side image capture unit 6700 may have a relative orientation, which may correspond with an optical axis of the field of view (not expressly shown) of the right-side image capture unit 6700. The relative orientation of the right-side image capture unit 6700 may be horizontally aligned to the right of the vehicle 6000, such as at zero degrees as shown. The relative orientation of the right-side image capture unit 6700 may be vertically aligned with the horizon (not shown). Other relative orientation may be used.

The perception unit 6800 includes a front image processing unit 6810, a rear image processing unit 6820, and a perception control unit 6830. Although the image processing units 6810, 6820 and the perception control unit 6830 are shown separately for clarity, two or more of the image processing units 6810, 6820 and the perception control unit 6830 may be implemented as a combined unit. As shown in FIG. 6, the center-forward image capture unit 6100, the left-forward image capture unit 6200, and the right-forward image capture unit 6300 are shown in communication with the front image processing unit 6810. The left-rear image capture unit 6400, the right-rear image capture unit 6500, the left-side image capture unit 6600, and the right-side image capture unit 6700 are shown in communication with the rear image processing unit 6820. The image processing units 6810, 6820 are shown in communication with the perception control unit 6830. Other configurations of image processing units, control units, and communication paths may be used.

The perception unit 6800 may obtain saliency information for perception control. For example, the perception unit 6800 may receive the saliency information from another unit (not shown) of the vehicle 6000, such as the autonomous vehicle operational management controller 4100 shown in FIG. 4. The saliency information may indicate a portion of the visual field surrounding the autonomous vehicle. The perception unit 6800 may correlate the saliency information to one or more sensors of the autonomous vehicle. For example, the perception control unit 6830 may receive the saliency information from the autonomous vehicle operational management controller (not shown) of the vehicle 6000, and the perception control unit 6830 may transmit, send, or otherwise make available, such as by storing in a shared memory, the saliency information, or a portion thereof to the front image processing unit 6810, the rear image processing unit 6820, or both.

The front image processing unit 6810 (first image processing unit) may receive sensor information, such as image data, from the center-forward image capture unit 6100, the left-forward image capture unit 6200, and the right-forward image capture unit 6300. The front image processing unit 6810 may receive saliency information corresponding to the center-forward image capture unit 6100, the left-forward image capture unit 6200, and the right-forward image capture unit 6300 from the perception control unit 6830. The front image processing unit 6810 may generate image processing data (first image processing data), which may include front external object information, based on the sensor information received from the center-forward image capture unit 6100, the left-forward image capture unit 6200, and the right-forward image capture unit 6300. Generating the image processing data may include generating the image processing data based on and the saliency information received from the perception control unit 6830.

The rear image processing unit 6820 (second image processing unit) may receive sensor information, such as image data, from the left-rear image capture unit 6400, the right-rear image capture unit 6500, the left-side image capture unit 6600, and the right-side image capture unit 6700. The rear image processing unit 6820 may receive saliency information corresponding to the left-rear image capture unit 6400, the right-rear image capture unit 6500, the left-side image capture unit 6600, and the right-side image capture unit 6700 from the perception control unit 6830. The rear image processing unit 6820 may generate image processing data (second image processing data), which may include rear external object information, based on the sensor information received from the left-rear image capture unit 6400, the right-rear image capture unit 6500, the left-side image capture unit 6600, and the right-side image capture unit 6700. Generating the image processing data may include generating the image processing data based on and the saliency information received from the perception control unit 6830.

The perception control unit 6830 may generate external object information based on the image processing data received from the front image processing unit 6810, or a portion thereof, based on the image processing data received from the rear image processing unit 6820, or a portion thereof, or based on a combination of the image processing data received from the front image processing unit 6810 and the image processing data received from the rear image processing unit 6820, or a portion thereof. The perception control unit 6830 may transmit, send, or otherwise make available, such as by storing in a shared memory, the external object information to the autonomous vehicle operational management controller (not shown) of the vehicle 6000.

FIG. 7 is a diagram of an example of fields of view for sensors of a vehicle in accordance with embodiments of this disclosure. FIG. 7 shows a vehicle 7000, such as the vehicle 6000 shown in FIG. 6. Although not expressly shown in FIG. 7 for clarity, the vehicle 7000 may include sensors, such as the image capture units 6100-6700 shown in FIG. 6. For simplicity and clarity, FIG. 7 is oriented with north at the top and east at the right. For simplicity and clarity, in FIG. 7 east, to the right, is described as corresponding to an angle of zero degrees such that the vehicle 7000 is oriented in alignment with north corresponding to an angle of ninety degrees.

Each of the image capture units may have a respective relative orientation, as described in relation to FIG. 6, and field of view 7100-7700 as shown in FIG. 7. Each field of view 7100-7700 may have a defined angle of view and a defined effective range.

The effective range represents the maximum distance (working distance), from the image capture unit, at which an external object having a defined minimum external object size may be detected with an accuracy that exceeds a defined minimum object detection accuracy threshold. The defined minimum external object size may be a defined horizontal (or vertical) dimension of the external object relative to the field of view (perspective), such as 100 mm. Other defined minimum external object sizes may be used. A defined minimum external object horizontal (or vertical) resolution may be a defined minimum horizontal (or vertical) cardinality of pixels (contiguous), such as four pixels, that may be used to capture an external object having the defined minimum external horizontal (or vertical) object size for object detection. Other defined minimum external object resolutions may be used. Spatial resolution may be a ratio of the defined minimum external object size to the defined minimum external object resolution. For example, the defined minimum external object size may be 100 mm, the defined minimum external object resolution may be four pixels, and the spatial resolution may be 100 mm/4 pixels, or 25 mm per pixel.

The horizontal (or vertical) angular resolution of the image capture unit may be a ratio between the horizontal (or vertical) image sensor resolution of the image sensor of the image capture unit and the horizontal (or vertical) angle of view of the image capture unit. For example, the image capture unit may have a horizontal angle of view of ten degrees, an image sensor resolution of 1280×800, and a horizontal angular resolution of 128 pixels per degree of horizontal angle of view. In another example, the image capture unit may have a horizontal angle of view of 120 degrees, an image sensor resolution of 1280×800, and a horizontal angular resolution of eleven pixels per degree of horizontal angle of view.

The effective range may be correlated with the horizontal (or vertical) angular resolution. For example, the image capture unit may have a horizontal angle of view of 180 degrees, an image sensor resolution of 1280×800, a horizontal angular resolution of seven pixels per degree of horizontal angle of view, and the effective range for detecting a remote vehicle may be forty meters. In another example, the image capture unit may have a horizontal angle of view of 120 degrees, an image sensor resolution of 1280×800, a horizontal angular resolution of eleven pixels per degree of horizontal angle of view, and the effective range for detecting a remote vehicle may be sixty meters. In another example, the image capture unit may have a horizontal angle of view of sixty degrees, an image sensor resolution of 1280×800, a horizontal angular resolution of 21 pixels per degree of horizontal angle of view, and the effective range for detecting a remote vehicle may be 120 meters.

The vehicle 7000 may include a first image capture unit, such as the center-forward image capture unit 6100 shown in FIG. 6. The first image capture unit may have a first field of view 7100 (front field of view), which may be oriented toward the front of the vehicle 7000 as shown. The first field of view 7100 may be oriented along an optical axis of the first image capture unit (not expressly shown) and may have a first defined angle of view, such as 120 degrees, as shown. The first field of view 7100 may have a first effective range, such as sixty meters for a remote vehicle.

The vehicle 7000 may include a second image capture unit, such as the left-forward image capture unit 6200 shown in FIG. 6. The second image capture unit may have a second field of view 7200 (first side field of view), which may be oriented to the left of the vehicle 7000 as shown. The second field of view 7200 may be oriented along an optical axis of the second image capture unit (not expressly shown) and may have a second defined angle of view, such as sixty degrees, as shown. The second field of view 7200 may have a second effective range, such as 120 meters for a remote vehicle.

The vehicle 7000 may include a third image capture unit, such as the right-forward image capture unit 6300 shown in FIG. 6. The third image capture unit may have a third field of view 7300 (second side field of view), which may be oriented to the right of the vehicle 7000 as shown. The third field of view 7300 may be oriented along an optical axis of the third image capture unit (not expressly shown) and may have the second defined angle of view, such as sixty degrees, as shown. The third field of view 7300 may have the second effective range, such as 120 meters for a remote vehicle.

The vehicle 7000 may include a fourth image capture unit, such as the left-rear image capture unit 6400 shown in FIG. 6. The fourth image capture unit may have a fourth field of view 7400 (first rear field of view), which may be oriented to the left-rear of the vehicle 7000 as shown. The fourth field of view 7400 may be oriented along an optical axis of the fourth image capture unit (not expressly shown) and may have a third defined angle of view, such as sixty degrees, as shown. The fourth field of view 7400 may have a third effective range, such as 120 meters for a remote vehicle.

The vehicle 7000 may include a fifth image capture unit, such as the right-rear image capture unit 6500 shown in FIG. 6. The fifth image capture unit may have a fifth field of view 7500 (second rear field of view), which may be oriented to the right-rear of the vehicle 7000 as shown. The fifth field of view 7500 may be oriented along an optical axis of the fifth image capture unit (not expressly shown) and may have the third defined angle of view, such as sixty degrees, as shown. The fifth field of view 7500 may have the third effective range, such as 120 meters for a remote vehicle.

The vehicle 7000 may include a sixth image capture unit, such as the left-side image capture unit 6600 shown in FIG. 6. The sixth image capture unit may have a sixth field of view 7600 (third side field of view), which may be oriented to the left-side of the vehicle 7000 as shown. The sixth field of view 7600 may be oriented along an optical axis of the sixth image capture unit (not expressly shown) and may have a fourth defined angle of view, such as 180 degrees, as shown. The sixth field of view 7600 may have a fourth effective range, such as forty meters for a remote vehicle.

The vehicle 7000 may include a seventh image capture unit, such as the right-side image capture unit 6700 shown in FIG. 6. The seventh image capture unit may have a seventh field of view 7700 (fourth side field of view), which may be oriented to the right-side of the vehicle 7000 as shown. The seventh field of view 7700 may be oriented along an optical axis of the seventh image capture unit (not expressly shown) and may have the fourth defined angle of view, such as 180 degrees, as shown. The seventh field of view 7700 may have the fourth effective range, such as forty meters for a remote vehicle.

Portions of the fields of view 7100-7700 may overlap as indicated by the dark stippled portions. For example, as shown, the front field of view 7100 partially overlaps the left front field of view 7200, the right front field of view 7300, the left-side field of view 7600 and the right-side field of view 7700.

Figure 8:
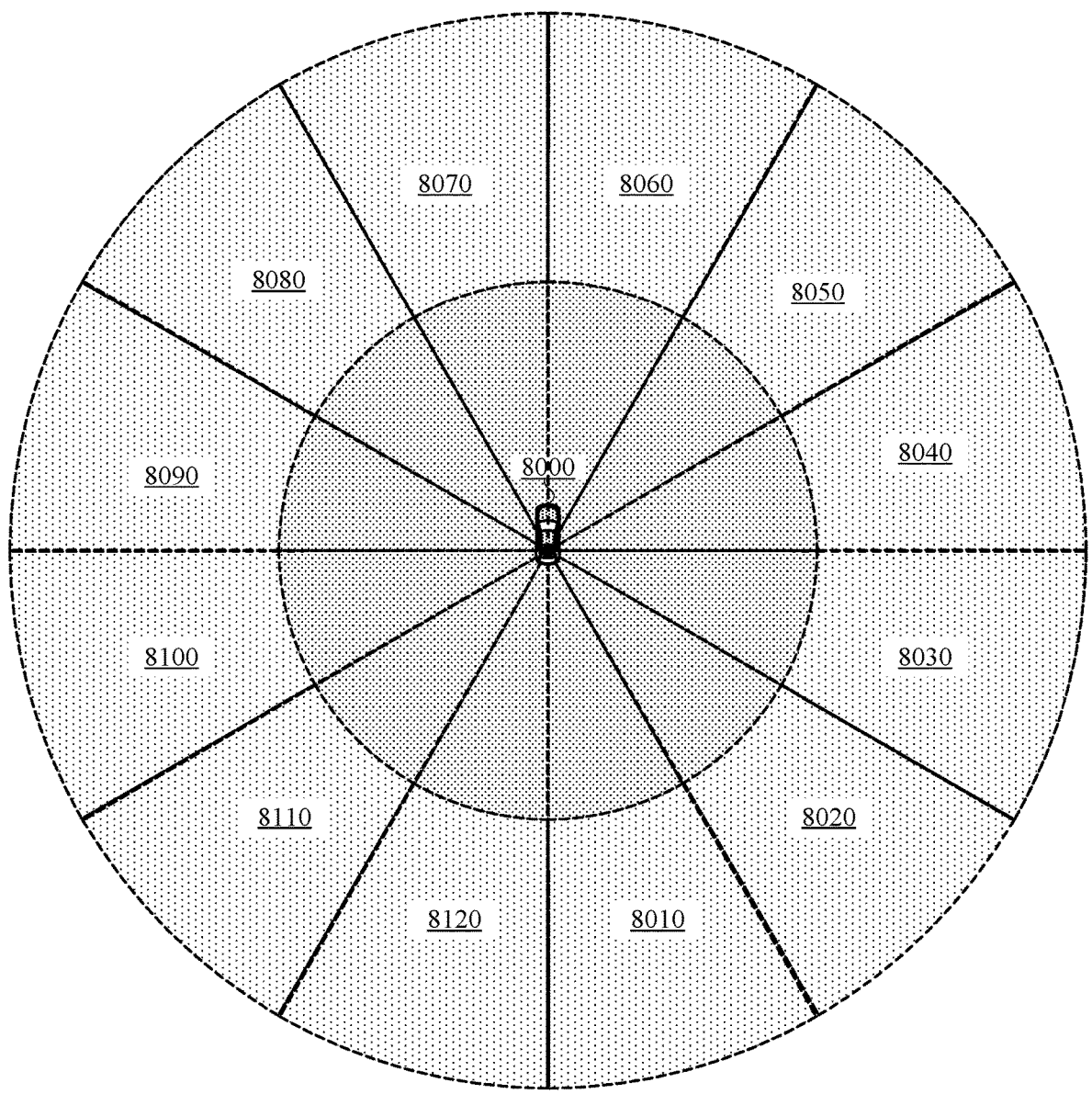
FIG. 8 is a diagram of an example of saliency regions in accordance with embodiments of this disclosure.

FIG. 8 is a diagram of an example of saliency regions in accordance with embodiments of this disclosure. FIG. 8 shows a vehicle 8000, such as the vehicle 6000 shown in FIG. 6. FIG. 8 shows non-overlapping saliency sectors 8010-8120 relative to the vehicle 8000. Each of the saliency sectors 8010-8120 includes an angular portion of a contiguous saliency range relative to the vehicle 8000 representing the operational environment of the vehicle 8000. For example, each saliency sector 8010-8120 may include thirty degrees, as shown. A different number (cardinality) and size of sectors may be used. A different orientation of saliency sectors and the contiguous saliency region may be used. For simplicity and clarity, FIG. 8 is oriented with north at the top and east at the right.

As shown, the saliency sectors include a first saliency sector 8010 south-south-east of the autonomous vehicle 8000, a second saliency sector 8020 south-east of the autonomous vehicle 8000, a third saliency sector 8030 east-south-east of the autonomous vehicle 8000, a fourth saliency sector 8040 east-north-east of the autonomous vehicle 8000, a fifth saliency sector 8050 north-east of the autonomous vehicle 8000, a sixth saliency sector 8060 north-north-east of the autonomous vehicle 8000, a seventh saliency sector 8070 north-north-west of the autonomous vehicle 8000, an eighth saliency sector 8080 north-west of the autonomous vehicle 8000, a ninth saliency sector 8090 west-north-west of the autonomous vehicle 8000, a tenth saliency sector 8100 west-south-west of the autonomous vehicle 8000, an eleventh saliency sector 8110 south-west of the autonomous vehicle 8000, and a twelfth saliency sector 8120 south-south-west of the autonomous vehicle 8000.

Each saliency sector 8010-8120 includes a near saliency distance portion, as indicated by the dark stippled background, and a far saliency distance portion as indicated by the light stippled background. For example, the near saliency distance may correspond with an area relatively near the vehicle 8000, such as within sixty meters of the vehicle 8000, and the far saliency distance may correspond with an area relatively far from the vehicle 8000, such as at least sixty meters from the vehicle, such as a distance of 120 meters from the vehicle 8000. The available saliency sectors 8010-8120, including angular size, saliency distances, and orientation, may be defined for the vehicle 8000. A saliency region may be indicated as a saliency sector 8010-8120 and a saliency distance, such as near or far.

Saliency information may indicate or identify one or more saliency regions, saliency sectors, saliency distances, or a combination thereof, relative to the vehicle 8000. The saliency information may indicate a relative priority, such as high priority or low priority corresponding to respective saliency regions or sectors. For example, an integer value, such as an integer value in the range 0-23, representing each saliency region may be used. In another example, an integer value, such as an integer value in the range 0-11, representing each saliency sector, and a binary value [0,1] representing the near saliency distance or the far saliency distance may be used. In another example, a binary value representing the high priority or the low priority may be used. Other representations of saliency information may be used.

Figure 9:
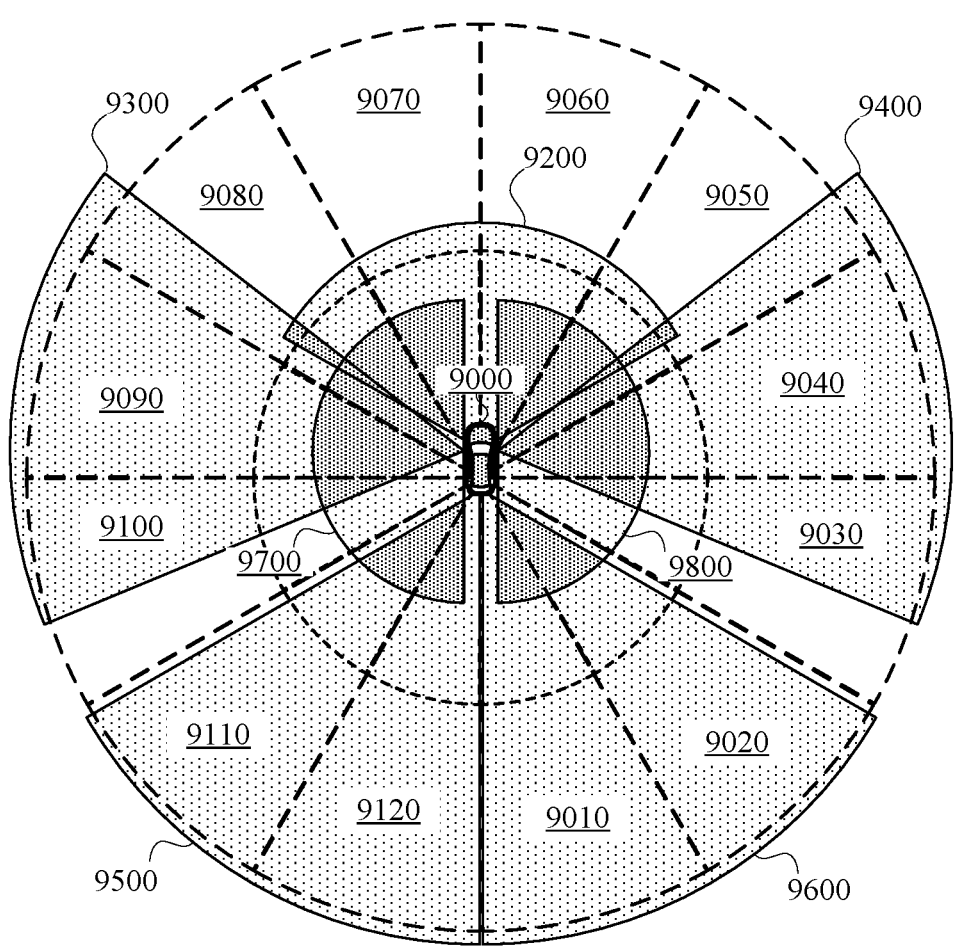
FIG. 9 is a diagram of an example correspondence between non-overlapping saliency sectors and fields of view in accordance with embodiments of this disclosure.

FIG. 9 is a diagram of an example correspondence between non-overlapping saliency sectors 9010-9120, such as the non-overlapping saliency sectors 8010-8120 shown in FIG. 8, and fields of view 9200-9800, the fields of view 7100-7700 shown in FIG. 7, relative to a vehicle 9000 in accordance with embodiments of this disclosure. For simplicity and clarity, FIG. 9 is oriented with north at the top and east at the right.

As shown, a first image capture unit, such as the center-forward image capture unit 6100 shown in FIG. 6, of the vehicle 9000 has a first field of view 9200, such as the field of view 7100 shown in FIG. 7, that overlaps, or partially overlaps, at least a portion of a saliency region corresponding to the far saliency distance for a saliency sector 9050 north-east of the autonomous vehicle 9000, a saliency region corresponding to the near saliency distance for a saliency sector 9050 north-east of the autonomous vehicle 9000, a saliency region corresponding to the far saliency distance for a saliency sector 9060 north-north-east of the autonomous vehicle 9000, a saliency region corresponding to the near saliency distance for a saliency sector 9060 north-north-east of the autonomous vehicle 9000, a saliency region corresponding to the far saliency distance for a saliency sector 9070 north-north-west of the autonomous vehicle 9000, a saliency region corresponding to the near saliency distance for a saliency sector 9070 north-north-west of the autonomous vehicle 9000, a saliency region corresponding to the far saliency distance for a saliency sector 9080 north-west of the autonomous vehicle 9000, and a saliency region corresponding to the near saliency distance for a saliency sector 9080 north-west of the autonomous vehicle 9000.

As shown, a second image capture unit, such as the left-forward image capture unit 6200 shown in FIG. 6, of the vehicle 9000 has a second field of view 9300, such as the field of view 7200 shown in FIG. 7, that overlaps, or partially overlaps, at least a portion of a saliency region corresponding to the far saliency distance for a saliency sector 9080 north-west of the autonomous vehicle 9000, a saliency region corresponding to the near saliency distance for a saliency sector 9080 north-west of the autonomous vehicle 9000, a saliency region corresponding to the far saliency distance for a saliency sector 9090 west-north-west of the autonomous vehicle 9000, a saliency region corresponding to the near saliency distance for a saliency sector 9090 west-north-west of the autonomous vehicle 9000, a saliency region corresponding to the far saliency distance for a saliency sector 9100 west-south-west of the autonomous vehicle 9000, and a saliency region corresponding to the near saliency distance for a saliency sector 9100 west-south-west of the autonomous vehicle 9000.

As shown, a third image capture unit, such as the right-forward image capture unit 6300 shown in FIG. 6, of the vehicle 9000 has a third field of view 9400, such as the field of view 7300 shown in FIG. 7, that overlaps, or partially overlaps, at least a portion of a saliency region corresponding to the far saliency distance for a saliency sector 9030 east-south-east of the autonomous vehicle 9000, a saliency region corresponding to the near saliency distance for a saliency sector 9030 east-south-east of the autonomous vehicle 9000, a saliency region corresponding to the far saliency distance for a saliency sector 9040 east-north-east of the autonomous vehicle 9000, a saliency region corresponding to the near saliency distance for a saliency sector 9040 east-north-east of the autonomous vehicle 9000, a saliency region corresponding to the far saliency distance for a saliency sector 9050 north-east of the autonomous vehicle 9000, and a saliency region corresponding to the near saliency distance for a saliency sector 9050 north-east of the autonomous vehicle 9000.

As shown, a fourth image capture unit, such as the left-rear image capture unit 6400 shown in FIG. 6, of the vehicle 9000 has a fourth field of view 9500, such as the field of view 7400 shown in FIG. 7, that overlaps, or partially overlaps, at least a portion of a saliency region corresponding to the far saliency distance for a saliency sector 9110 south-west of the autonomous vehicle 9000, a saliency region corresponding to the near saliency distance for a saliency sector 9110 south-west of the autonomous vehicle 9000, a saliency region corresponding to the far saliency distance for a saliency sector 9120 south-south-west of the autonomous vehicle 9000, and a saliency region corresponding to the near saliency distance for a saliency sector 9120 south-south-west of the autonomous vehicle 9000.

As shown, a fifth image capture unit, such as the right-rear image capture unit 6500 shown in FIG. 6, of the vehicle 9000 has a fifth field of view 9600, such as the field of view 7500 shown in FIG. 7, that overlaps, or partially overlaps, at least a portion of a saliency region corresponding to the far saliency distance for a saliency sector 9010 south-south-east of the autonomous vehicle 9000, a saliency region corresponding to the near saliency distance for a saliency sector 9010 south-south-east of the autonomous vehicle 9000, a saliency region corresponding to the far saliency distance for a saliency sector 9020 south-east of the autonomous vehicle 9000, and a saliency region corresponding to the near saliency distance for a saliency sector 9020 south-east of the autonomous vehicle 9000.

As shown, a sixth image capture unit, such as the left-side image capture unit 6600 shown in FIG. 6, of the vehicle 9000 has a sixth field of view 9700, such as the field of view 7700 shown in FIG. 7, that overlaps, or partially overlaps, at least a portion of a saliency region corresponding to the near saliency distance for a saliency sector 9070 north-north-west of the autonomous vehicle 9000, a saliency region corresponding to the near saliency distance for a saliency sector 9080 north-west of the autonomous vehicle 9000, a saliency region corresponding to the near saliency distance for a saliency sector 9090 west-north-west of the autonomous vehicle 9000, a saliency region corresponding to the near saliency distance for a saliency sector 9100 west-south-west of the autonomous vehicle 9000, a saliency region corresponding to the near saliency distance for a saliency sector 9110 south-west of the autonomous vehicle 9000, and a saliency region corresponding to the near saliency distance for a saliency sector 9120 south-south-west of the autonomous vehicle 9000.

As shown, a seventh image capture unit, such as the right-side image capture unit 6700 shown in FIG. 6, of the vehicle 9000 has a seventh field of view 9800, such as the field of view 7800 shown in FIG. 7, that overlaps, or partially overlaps, at least a portion of a saliency region corresponding to the near saliency distance for a saliency sector 9010 south-south-east of the autonomous vehicle 9000, a saliency region corresponding to the near saliency distance for a saliency sector 9020 south-east of the autonomous vehicle 9000, a saliency region corresponding to the near saliency distance for a saliency sector 9030 east-south-east of the autonomous vehicle 9000, a saliency region corresponding to the near saliency distance for a saliency sector 9040 east-north-east of the autonomous vehicle 9000, a saliency region corresponding to the near saliency distance for a saliency sector 9050 north-east of the autonomous vehicle 9000, and a saliency region corresponding to the near saliency distance for a saliency sector 9060 north-north-east of the autonomous vehicle 9000.

Figure 10:
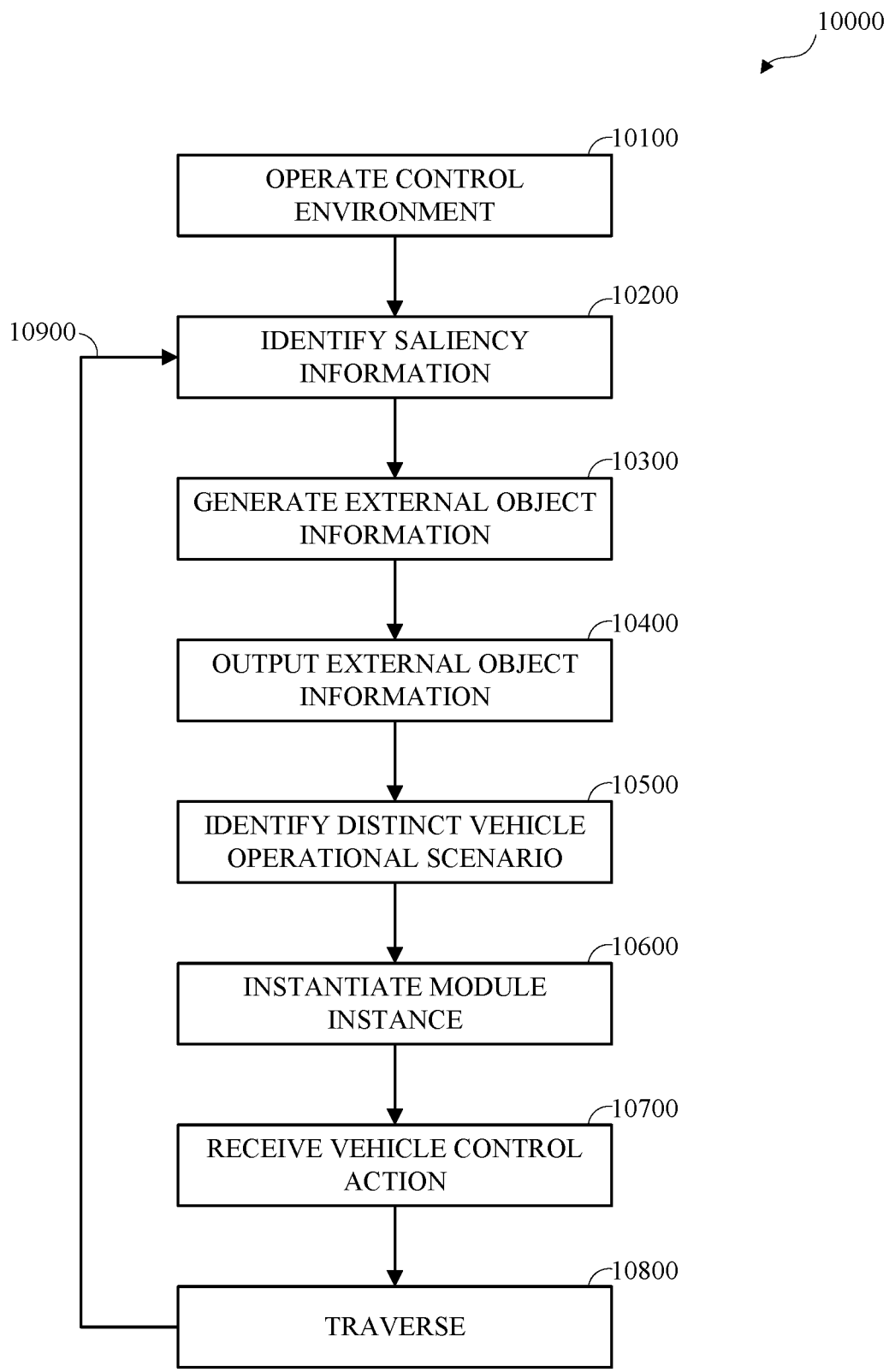
FIG. 10 is a flow diagram of an example of autonomous vehicle operational management with visual saliency perception control in accordance with embodiments of this disclosure.

FIG. 10 is a flow diagram of an example of autonomous vehicle operational management with visual saliency perception control 10000 in accordance with embodiments of this disclosure. Autonomous vehicle operational management with visual saliency perception control 10000 may be implemented in an autonomous vehicle, such as the autonomous vehicle 1000 shown in FIG. 1, one of the autonomous vehicles 2100/2110 shown in FIG. 2, one of the autonomous vehicles 6000-9000 shown in FIGS. 6-9, a semi-autonomous vehicle, or any other vehicle implementing autonomous driving. The autonomous vehicle may traverse a vehicle transportation network, such as the autonomous vehicle transportation network, or a portion thereof, as shown in FIGS. 2 and 3.

The autonomous vehicle may implement an autonomous vehicle operational management system, such as the autonomous vehicle operational management system 4000 shown in FIG. 4, and may include an autonomous vehicle operational management controller, such as the autonomous vehicle operational management controller 4100 shown in FIG. 4. The autonomous vehicle may include a perception unit, such as the perception unit 6800 shown in FIG. 6, which may include a front image processing unit, such as the front image processing unit 6810 shown in FIG. 6, a rear image processing unit, such as the rear image processing unit 6820 shown in FIG. 6, and a perception control unit, such as the perception control unit 6830 shown in FIG. 6. The autonomous vehicle may include sensors, such as the image capture units 6100-6700 shown in FIG. 6.

Autonomous vehicle operational management with visual saliency perception control 10000 may include operating the perception unit, the autonomous vehicle operational management controller, or both, and may include operating an autonomous vehicle operational control environment at 10100, identifying saliency information at 10200, generating external object information at 10300, outputting the external object information at 10400, identifying the distinct vehicle operational scenario at 10500, instantiating a scenario-specific operational control evaluation module instance at 10600, receiving a candidate vehicle control action at 10700, and traversing a portion of the autonomous vehicle transportation network at 10800.

An autonomous vehicle may operate an autonomous vehicle operational control environment at 10100, which may include generating the autonomous vehicle operational control environment. For example, the autonomous vehicle operational management controller may generate an autonomous vehicle operational control environment for operating a scenario-specific operational control evaluation module instance. The autonomous vehicle operational control environment may include one or more operational environment monitors, such as the operational environment monitors 4200 shown in FIG. 4.

Saliency information may be identified at 10200. For example, the autonomous vehicle operational management controller may generate the saliency information at 10200. The saliency information may indicate a saliency, importance, or relative operational utility, for a portion of the visual field surrounding the autonomous vehicle. For example, the saliency information may indicate or identify one or more saliency regions, saliency sectors, saliency distances, or a combination thereof, relative to the vehicle, such as the saliency regions shown in FIG. 8. The saliency information may indicate a relative priority, such as high priority or low priority, corresponding to respective saliency regions or sectors.

In some implementations, the saliency information may include saliency distance information and priority information for each saliency sector. For example, for each saliency sector, such as the saliency sectors 8010-8120 shown in FIG. 8, the saliency information may indicate the near saliency distance, which may be expressed as the binary value 01, the far saliency distance, which may be expressed as the binary value 10, or a combination of the near saliency distance and the far saliency distance, which may be expressed as the binary value 00 or 11, and may indicate a relative priority, such as the low relative priority, which may be expressed as the binary value 0, or the far relative priority, which may be expressed as the binary value 1. In some implementations, the relative priority information may be a ranking or may be probabilistic. In some implementations, the saliency information may omit saliency information for saliency regions associated with the low priority.

Generating the saliency information may include using, for example, vehicle transportation network information, such as map data, representing the operational environment of the autonomous vehicle, previously identified external object data, or a combination thereof. The previously identified external object data may be data previously generated by the autonomous vehicle operational management system, which may include projected external object data or external object probability data. In some implementations, operating an autonomous vehicle operational control environment at 10100 may be omitted and another unit of the vehicle, such as an external object tracking unit, may generate the saliency information.

The perception unit may obtain the saliency information at 10200. For example, the perception unit may receive the saliency information from the autonomous vehicle operational management controller.

Operating the perception unit may include generating external object information at 10300. For example, the perception unit may generate external object information corresponding to one or more external objects within a defined distance of the autonomous vehicle based on the saliency information identified at 10100. Generating the external object information may include processing the saliency information for perception control. For example, the perception control unit may correlate the saliency information with the available sensors of the autonomous vehicle. For example, the perception unit may receive one or more images, which may be substantially contemporaneous images, from one or more image capture units of the autonomous vehicle, such as the image capture units 6100-6700 shown in FIG. 6, which may correspond with one or more fields-of-view, such as the fields-of-view 7100-7700 shown in FIG. 7, and the perception control unit may correlate the saliency information to identify salient portions of the images captured by the image capture units. Each image may capture a substantially temporally contemporaneous portion of the visual filed of the operational environment of the autonomous vehicle. The perception control unit may identify one or more image capture units, the corresponding image processing unit, or both, corresponding to a saliency region indicated by the saliency information. The perception control unit may transmit, send, or otherwise make available, such as by storing in a shared memory, the saliency information, or a portion thereof, to the front image processing unit, the rear image processing unit, or both.

The respective image processing units may determine a salient portion of the sensor information based on the saliency information. The sensor information, such as an image, for a sensor, such as an image capture unit, of the autonomous vehicle, may be omitted from the salient portion. For example, an image captured by an image capture unit of the autonomous vehicle may be non-overlapping with the saliency regions identified in the saliency information and the image may be omitted from the salient portion. In another example, an image captured by an image capture unit of the autonomous vehicle may be overlapping with the saliency regions identified in the saliency information and the image, or a portion thereof, may be included in the salient portion. For example, the sensor information may be an image captured by an image capture unit of the autonomous vehicle, and the salient portion may be a spatially contiguous region or patch of the image. The image processing unit may identify one or more portions of an image as salient portions and may identify the rest of the image as a non-salient portion. For example, an image captured by an image capture unit of the autonomous vehicle may have a field of view that includes multiple saliency regions and the image processing unit may identify a portion of the image corresponding to a high priority saliency region indicated in the saliency information as a saliency portion. Portions of the image corresponding to saliency regions identified as low priority in, or omitted from, the saliency information may be identified as the non-salient portion. The size of the salient portion, relative to the size of the image, may be determined based on the saliency distance information.

In an example, the front image processing unit may identify one or more salient portions (first image processing data) based on images captured by a first image capture unit of the autonomous vehicle, such as the center image capture unit, a second image capture unit of the autonomous vehicle, such as the right-front image capture unit, and a third image capture unit of the autonomous vehicle, such as the left-front image capture unit. The rear image processing unit may identify one or more salient portions (second image processing data) based on images captured by a fourth image capture unit of the autonomous vehicle, such as the left-rear image capture unit, a fifth image capture unit of the autonomous vehicle, such as the right-rear image capture unit, a sixth image capture unit of the autonomous vehicle, such as the left image capture unit, and a seventh image capture unit of the autonomous vehicle, such as the right image capture unit.

In some implementations, an image processing unit may identify a set of salient portions (candidate salient portions) that has a cardinality that exceeds a defined cardinality, such as three, the image processing unit may determine a respective priority for each salient portion based on the saliency information, the image processing unit may include the defined cardinality of candidate salient portions hiving the highest priority in the salient portions, and may include the candidate salient portions other than the salient portions in the non-salient portion. A minimum priority for the salient portions may exceed a maximum priority for the candidate salient portions in the non-salient portion.

The perception unit may generate the external object information based on the salient portion, or portions, of the sensor information. For example, the front image processing unit may generate external object candidate information based on the salient portion, or portions, corresponding to the center image capture unit, the front-left image capture unit, and the front-right image capture unit, and the rear image processing unit may generate external object candidate information based on the salient portion, or portions, corresponding to the left-rear image capture unit, the right-rear image capture unit, the left image capture unit, and the right image capture unit. Generating the external object information may include evaluating the salient portion, or portions, using a deep learning object classification algorithm.

Operating the perception unit may include outputting the external object information at 10400. For example, the perception unit may transmit, send, or otherwise make available, such as by storing in a shared memory, the external object information, or a portion thereof, to the autonomous vehicle operational management controller, or to another unit or units of the vehicle.

Operating the autonomous vehicle operational management controller may include identifying the distinct vehicle operational scenario at 10500. The autonomous vehicle operational management controller may identify the distinct vehicle operational scenario using the external object information output by the perception unit at 10400. For example, the autonomous vehicle operational management controller may receive the external object information received sent by the perception unit at 10400 and may identify the distinct vehicle operational scenario in response to receiving the external object information.

Operating the autonomous vehicle operational management controller may include instantiating a scenario-specific operational control evaluation module instance at 10600. For example, the autonomous vehicle operational management controller may instantiate a scenario-specific operational control evaluation module instance in response to identifying the distinct vehicle operational scenario at 10500. The scenario-specific operational control evaluation module instance may include an instance of a scenario-specific operational control evaluation model of a distinct vehicle operational scenario. Operating the scenario-specific operational control evaluation module instance may include identifying a policy for the scenario-specific operational control evaluation model.

Operating the autonomous vehicle operational management controller may include receiving a candidate vehicle control action at 10700. For example, the autonomous vehicle operational management controller may receive a candidate vehicle control action from the policy for the scenario-specific operational control evaluation module instance instantiated at 10600.

Operating the autonomous vehicle operational management controller may include controlling the autonomous vehicle to traverse a portion of the autonomous vehicle transportation network at 10800. For example, the autonomous vehicle operational management controller may control the autonomous vehicle to traverse a portion of the autonomous vehicle transportation network in accordance with the candidate vehicle control action identified at 10700. The portion of the autonomous vehicle transportation network may include the distinct vehicle operational scenario identified at 10500.

Identifying saliency information at 10200, generating external object information at 10300, outputting the external object information at 10400, identifying the distinct vehicle operational scenario at 10500, instantiating a scenario-specific operational control evaluation module instance at 10600, receiving a candidate vehicle control action at 10700, and traversing a portion of the autonomous vehicle transportation network at 10800 may be sequentially repeated as indicated by the directional line at 10900.

Figure 11:
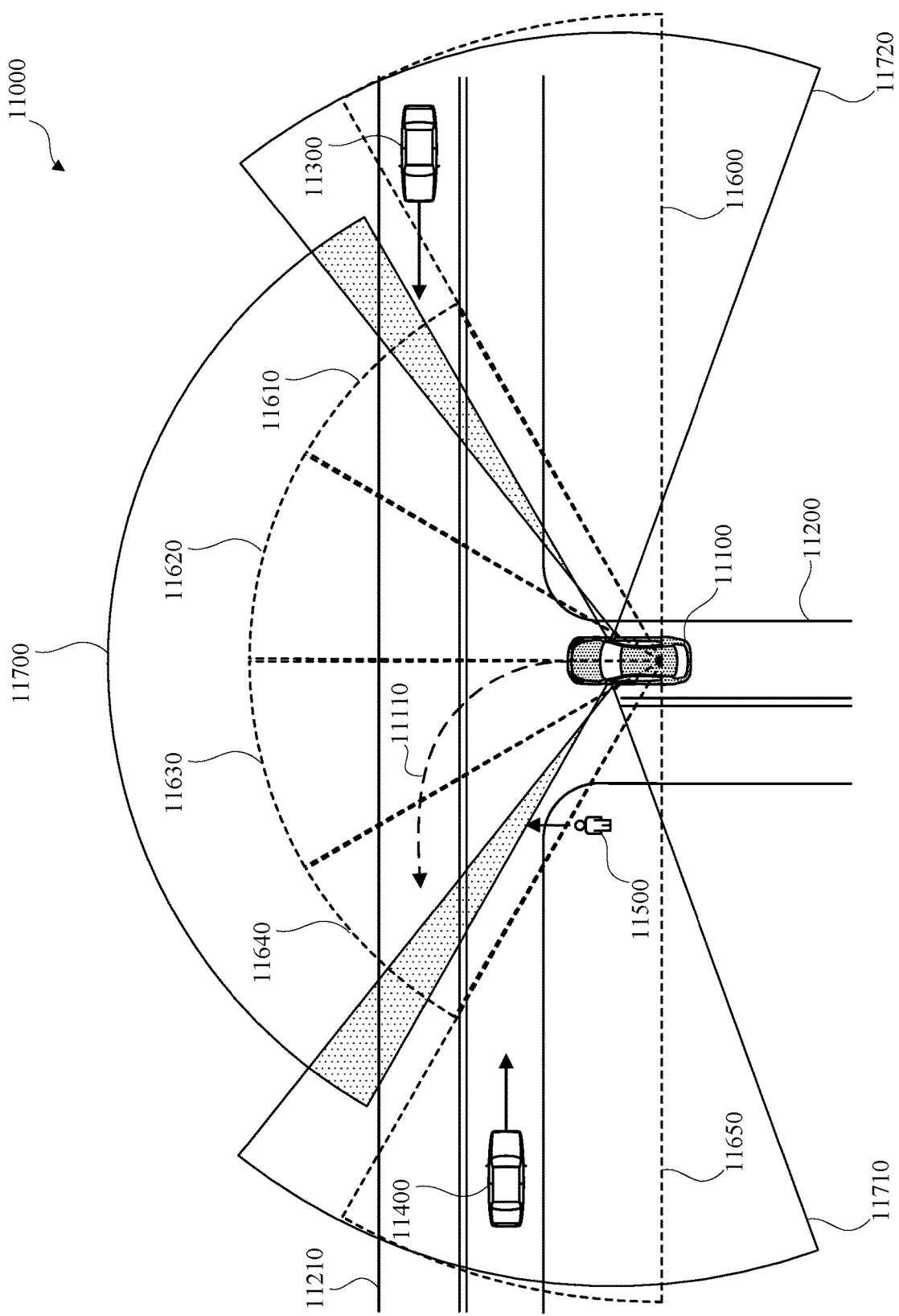
FIG. 11 is a diagram of an example of autonomous vehicle operational management with visual saliency perception control for a portion of a vehicle transportation network including an intersection scenario and a pedestrian scenario in accordance with embodiments of this disclosure.

FIG. 11 is a diagram of an example of autonomous vehicle operational management with visual saliency perception control for a portion 11000 of a vehicle transportation network including an intersection scenario and a pedestrian scenario in accordance with embodiments of this disclosure. Autonomous vehicle operational management with visual saliency perception control may include an autonomous vehicle 11100, such as the vehicle 1000 shown in FIG. 1, one of the vehicles 2100/2110 shown in FIG. 2, one of the vehicles 6000, 7000, 8000, 9000 shown in FIGS. 6-9, a semi-autonomous vehicle, or any other vehicle implementing autonomous driving, operating an autonomous vehicle operational management system, such as the autonomous vehicle operational management system 4000 shown in FIG. 4, which may include a model of an autonomous vehicle operational control scenario that includes the autonomous vehicle 11100 traversing a portion of the vehicle transportation network along a first road 11200 approaching an intersection with a second road 11210. For simplicity and clarity, the portion 11000 of the vehicle transportation network shown in FIG. 11 is oriented with north at the top and east at the right.

A first remote vehicle 11300 is shown traversing westbound along the second road 11210. A current trajectory for the first remote vehicle 11300 is indicated using a solid directional line. A second remote vehicle 11400 is shown traversing eastbound along the second road 11210. A current trajectory for the second remote vehicle 11400 is indicated using a solid directional line. A pedestrian 11500 is shown proximate to the intersection. A current trajectory for the pedestrian 11500 is shown using a solid directional line, indicating that the pedestrian 11500 may affect the operation of the autonomous vehicle 11100, such as, by traversing a portion of the second road 11210 along a path intersecting with the expected path 11110 of the autonomous vehicle 11100.

The autonomous vehicle operational management system may generate the saliency information based on operating environment information, which may include vehicle transportation network information indicating the orientation of the intersection and previously obtained external object information representing detected external objects, which may include the remote vehicles 11300, 11400 and the pedestrian 11500.

The autonomous vehicle 11100 may approach the intersection by traversing the first road 11200 to arrive at the current location as shown in FIG. 11. The autonomous vehicle operational management system of the autonomous vehicle 11100 may identify saliency information based on a set of non-overlapping saliency sectors, such as the non-overlapping saliency sectors 8010-8120 shown in FIG. 8, for traversing the portion 11000 of the vehicle transportation network shown in FIG. 11. For simplicity and clarity, identified saliency regions 11600-11650 are indicated using broken line outlines in FIG. 11. Although FIG. 11 shows the identified saliency regions 11600-11650 and omits the other saliency regions for simplicity and clarity, the other saliency regions, such as shown in FIG. 8, may be included in the set of non-overlapping saliency sectors. The autonomous vehicle operational management system of the autonomous vehicle 11100 may identify saliency distance information, saliency priority information, or a combination thereof, corresponding to respective saliency sectors.

The autonomous vehicle operational management system of the autonomous vehicle 11100 may operate an intersection monitor, such as the intersection monitor 4230 shown in FIG. 4, which may include instantiating the intersection monitor. The intersection monitor may process or evaluate vehicle transportation network data, such as map data, sensor data, or a combination thereof, representing a portion of the vehicle transportation network, such as a portion corresponding to an identified route for the autonomous vehicle 11100, a portion spatially proximate to the autonomous vehicle 11100, or an expected path 11110 for the autonomous vehicle 11100, or a combination thereof. The intersection monitor may identify or generate operational environment information representing the operational environment, or an aspect thereof, of the autonomous vehicle 11100.

The intersection monitor may determine, such as based on the vehicle transportation network information, that the operational environment of the autonomous vehicle includes the intersection, and may identify, such as based on the previously identified external object information, the first remote vehicle 11300 ahead and to the right of the autonomous vehicle, and the second remote vehicle 11400 ahead and to the left of the autonomous vehicle.

The intersection monitor may identify expected relative location information corresponding to each remote vehicle 11300, 11400. The intersection monitor may identify respective saliency regions corresponding to the expected relative locations for the remote vehicles 11300, 11400. The intersection monitor may identify a priority, such as the high priority, for each saliency region corresponding to a remote vehicle 11300, 11400.

As shown, the autonomous vehicle operational management system of the autonomous vehicle 11100 may identify a high priority for the saliency region corresponding to the far saliency distance for the saliency sector 11600 east-north-east of the autonomous vehicle 11100, which includes the first remote vehicle 11300, and may identify a high priority for the saliency region corresponding to the far saliency distance for the saliency sector 11650 west-north-west of the autonomous vehicle 11100, which includes the second remote vehicle 11400.

The intersection monitor may identify a right-of-way boundary location or another location in the vehicle transportation network, such as a location corresponding to a stop line in the vehicle transportation network. The right-of-way boundary location may be a location in the vehicle transportation network along an expected path 11110 of the autonomous vehicle 11100 between a current location of the autonomous vehicle 11100 and a right-of-way overlap area proximate to, such as immediately adjacent to or one meter from, the right-of-way overlap area which may be the closest location in the vehicle transportation network along the expected path 11110 for the autonomous vehicle 11100 to the right-of-way overlap area that the autonomous vehicle 11100 may safely traverse without entering the right-of-way overlap area. The intersection monitor may identify a saliency region corresponding to the expected relative orientation of the stop line or right-of-way boundary location relative to the current location of the autonomous vehicle 11100. The intersection monitor may identify a priority, such as the high priority, for the saliency region corresponding to the expected relative orientation of the stop line or right-of-way boundary location relative to the current location of the autonomous vehicle 11100. The intersection monitor may identify a saliency region along a current trajectory or expected path 11110 of the autonomous vehicle 11100 and may identify a priority, such as the low priority, for the saliency region along the current trajectory or expected path 11110 of the autonomous vehicle 11100.

As shown, the autonomous vehicle operational management system of the autonomous vehicle 11100 may identify a high priority for the saliency region corresponding to the near saliency distance for the saliency sector 11610 north-east of the autonomous vehicle 11100, the near saliency distance for the saliency sector 11620 north-north-east of the autonomous vehicle 11100, the near saliency distance for the saliency sector 11630 north-north-west of the autonomous vehicle 11100, and the near saliency distance for the saliency sector 11640 north-west of the autonomous vehicle 11100.

The autonomous vehicle operational management system of the autonomous vehicle 11100 may operate a pedestrian monitor, such as the pedestrian monitor 4220 shown in FIG. 4, which may include instantiating the pedestrian monitor. The pedestrian monitor may process or evaluate vehicle transportation network data, such as map data, sensor data, or a combination thereof, representing a portion of the vehicle transportation network, such as a portion corresponding to an identified route for the autonomous vehicle 11100, a portion spatially proximate to the autonomous vehicle 11100, or an expected path 11110 for the autonomous vehicle 11100, or a combination thereof. The pedestrian monitor may identify or generate operational environment information representing the operational environment, or an aspect thereof, of the autonomous vehicle 11100.

The pedestrian monitor may identify the pedestrian 11500 to the left of the autonomous vehicle 11100. The vehicle transportation network may include an overlapping portion of a pedestrian transportation network, such as crosswalk, (not expressly shown) and the pedestrian monitor may identify one or more saliency regions corresponding to a relative location of the crosswalk with respect to the current location of the autonomous vehicle 11100. The pedestrian monitor may identify a priority, such as the high priority, for the saliency regions corresponding to the pedestrian 11500, the pedestrian crosswalk, or both.

The autonomous vehicle operational management system of the autonomous vehicle 11100 may transmit, send, or otherwise make available, such as by storing in a shared memory, the identified saliency information to the perception unit of the autonomous vehicle 11100. For example, the autonomous vehicle operational management system of the autonomous vehicle 11100 may transmit, send, or otherwise make available, such as by storing in a shared memory, to the perception unit of the autonomous vehicle 11100 saliency information indicating the high priority for the far saliency distance for the saliency sector 11600 east-north-east of the autonomous vehicle 11100, the high priority for the near saliency distance for the saliency sector 11610 north-east of the autonomous vehicle 11100, the high priority for the near saliency distance for the saliency sector 11620 north-north-east of the autonomous vehicle 11100, the high priority for the near saliency distance for the saliency sector 11630 north-north-west of the autonomous vehicle 11100, the high priority for the near saliency distance for the saliency sector 11640 north-west of the autonomous vehicle 11100, and the high priority for the far saliency distance for the saliency sector 11650 west-north-west of the autonomous vehicle 11100. The saliency information may identify a low priority, or may omit saliency information, for the other saliency regions.

The perception unit of the autonomous vehicle 11100 may obtain, receive, read, or otherwise access, the saliency information and may correlate the saliency information to the respective fields-of-view of the image capture units of the autonomous vehicle 11100.

The perception unit of the autonomous vehicle 11100 may determine that the identified saliency regions 11600-11650 correspond spatially with the field of view 11700 of a center-forward image capture unit, such as the center-forward image capture unit 6100 shown in FIG. 6, of the autonomous vehicle 11100, the field of view 11710 of a left-forward image capture unit, such as the left-forward image capture unit 6200 shown in FIG. 6, of the autonomous vehicle 11100, and the field of view 11720 of a right-forward image capture unit, such as the right-forward image capture unit 6300 shown in FIG. 6, of the autonomous vehicle 11100.

For example, the perception control unit may determine that the saliency region 11600 corresponding to the far saliency distance for the saliency sector east-north-east of the autonomous vehicle corresponds to, such as spatially overlaps, the field of view 11720 of the right-front image capture unit of the autonomous vehicle. The perception control unit may determine that the saliency region 11610 corresponding to the near saliency distance for the saliency sector north-east of the autonomous vehicle corresponds to, such as spatially overlaps, the field of view 11720 of the right-front image capture unit of the autonomous vehicle, the field of view 11700 of the center image capture unit of the autonomous vehicle, and the field of view (not shown) of the right image capture unit of the autonomous vehicle. The perception control unit may determine that the saliency region 11620 corresponding to the near saliency distance for the saliency sector north-north-east of the autonomous vehicle corresponds to, such as spatially overlaps, the field of view 11700 of the center image capture unit of the autonomous vehicle, and the field of view (not shown) of the right image capture unit of the autonomous vehicle. The perception control unit may determine that the saliency region 11630 corresponding to the near saliency distance for the saliency sector north-north-west of the autonomous vehicle corresponds to, such as spatially overlaps, the field of view 11700 of the center image capture unit of the autonomous vehicle, and the field of view (not shown) of the left image capture unit of the autonomous vehicle. The perception control unit may determine that the saliency region 11640 corresponding to the near saliency distance for the saliency sector north-west of the autonomous vehicle corresponds to, such as spatially overlaps, the field of view 11710 of the left-front image capture unit of the autonomous vehicle, the field of view 11700 of the center image capture unit of the autonomous vehicle, and the field of view (not shown) of the left image capture unit of the autonomous vehicle. The perception control unit may determine that the saliency region 11650 corresponding to the far saliency distance for the saliency sector west-north-west of the autonomous vehicle corresponds to, such as spatially overlaps, the field of view 11710 of the left-front image capture unit of the autonomous vehicle.

The perception unit of the autonomous vehicle 11100 may generate external object information using sensor data captured, or otherwise generated, by the sensors corresponding to the identified saliency regions 11600-11650, such as a center-forward image capture unit of the autonomous vehicle 11100, a left-forward image capture unit of the autonomous vehicle 11100, and a right-forward image capture unit of the autonomous vehicle 11100.

For example, the perception control unit may identify the forward image processing unit as associated with the right-front image capture unit of the autonomous vehicle, the center image capture unit of the autonomous vehicle, and the left-front image capture unit of the autonomous vehicle, and may send, transmit, or otherwise provide the saliency information, or a corresponding portion thereof, to the front image processing unit. In some implementations, the perception control unit may omit sending saliency information to the rear image processing unit or may send saliency information to the rear image processing unit indicating an absence of salient regions corresponding to the rear image processing unit. In some implementations, the perception control unit may send the saliency information to both the front image processing unit and the rear image processing unit.

The perception unit of the autonomous vehicle 11100 may transmit, send, or otherwise make available, such as by storing in a shared memory, the external object information to the autonomous vehicle operational management system of the autonomous vehicle 11100.

The autonomous vehicle operational management controller may detect or identify one or more scenarios based on operational environment information including the external object information. For example, the autonomous vehicle operational management controller may detect or identify a first intersection scenario corresponding to the intersection and the first remote vehicle 11300, a second intersection scenario corresponding to the intersection and the second remote vehicle 11400, and a pedestrian scenario corresponding to the pedestrian 11500.

The autonomous vehicle operational management controller may instantiate one or more SSOCEM instances and may send, or otherwise make available, the operational environment information to the SSOCEM instances, in response to detecting or identifying scenarios. For example, the autonomous vehicle operational management controller may instantiate a first intersection-SSOCEM instance for the first intersection scenario corresponding to the intersection and the first remote vehicle 11300, the autonomous vehicle operational management controller may instantiate a second intersection-SSOCEM instance for the second intersection scenario corresponding to the intersection and the second remote vehicle 11400, and the autonomous vehicle operational management controller may instantiate a pedestrian-SSOCEM instance for the pedestrian scenario corresponding to the pedestrian 11500.

Instantiating the SSOCEM instances may include identifying a solution or policy for a model of the respective vehicle operational scenario. Identifying the solution or policy for the model of the vehicle operational scenario may include solving the corresponding SSOCEM model. Instantiating a respective SSOCEM instance may include instantiating an instance of the corresponding solution or policy.

The first intersection-SSOCEM solution instance may generate a first candidate vehicle control action, such as 'stop', 'orientation-adjust', or 'proceed', based on the respective modeled scenario and the corresponding operational environment information, and may output the respective candidate vehicle control action to the autonomous vehicle operational management controller, such as by sending the respective candidate vehicle control action to the autonomous vehicle operational management controller or storing the respective candidate vehicle control action for access by the autonomous vehicle operational management controller.

The second intersection-SSOCEM solution instance may generate a second candidate vehicle control action, such as 'stop', 'orientation-adjust', or 'proceed', based on the respective modeled scenario and the corresponding operational environment information, and may output the respective candidate vehicle control action to the autonomous vehicle operational management controller, such as by sending the respective candidate vehicle control action to the autonomous vehicle operational management controller or storing the respective candidate vehicle control action for access by the autonomous vehicle operational management controller.

The pedestrian-SSOCEM solution instance may generate a third candidate vehicle control action, such as 'stop', 'orientation-adjust', or 'proceed', based on the respective modeled scenario and the corresponding operational environment information, and may output the respective candidate vehicle control action to the autonomous vehicle operational management controller, such as by sending the respective candidate vehicle control action to the autonomous vehicle operational management controller or storing the respective candidate vehicle control action for access by the autonomous vehicle operational management controller.

The autonomous vehicle operational management controller may receive the candidate vehicle control actions from the respective instantiated SSOCEM instances and may identify a vehicle control action based on the received candidate vehicle control actions for controlling the autonomous vehicle 11100 at the corresponding temporal location and may control the autonomous vehicle to traverse the vehicle transportation network, or a portion thereof, in accordance with the identified vehicle control action.

Figure 12:
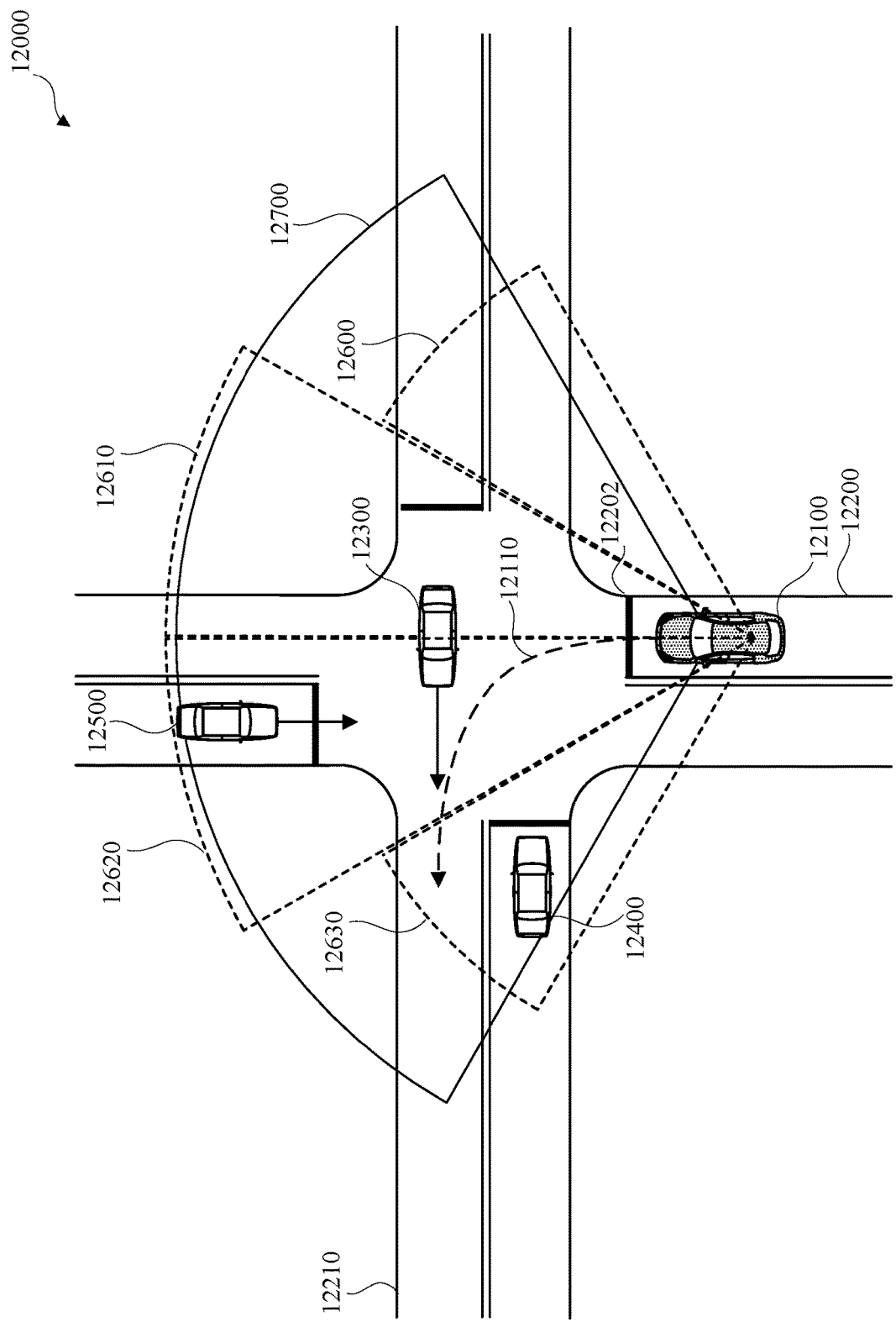
FIG. 12 is a diagram of an example of another portion of a vehicle transportation network including an intersection scenario in accordance with embodiments of this disclosure.

FIG. 12 is a diagram of an example of another portion 12000 of a vehicle transportation network including an intersection scenario in accordance with embodiments of this disclosure. Autonomous vehicle operational management may include an autonomous vehicle 12100, such as the vehicle 1000 shown in FIG. 1, one of the vehicles 2100/2110 shown in FIG. 2, one of the vehicles 6000, 7000, 8000, 9000 shown in FIGS. 6-9, a semi-autonomous vehicle, or any other vehicle implementing autonomous driving, operating an autonomous vehicle operational management system, such as the autonomous vehicle operational management system 4000 shown in FIG. 4, which may include a model of an autonomous vehicle operational control scenario that includes the autonomous vehicle 12100 traversing a portion of the vehicle transportation network along a first road 12200 approaching an intersection with a second road 12210. For simplicity and clarity, the portion 12000 of the vehicle transportation network shown in FIG. 12 is oriented with north at the top and east at the right.

A first remote vehicle 12300 is shown traversing westbound through the intersection along the second road 12210. A current trajectory for the first remote vehicle 12300 is indicated using a solid directional line. A second remote vehicle 12400 is shown traversing eastbound along the second road 12210. The second remote vehicle 12400 is shown as stationary at a stop line adjacent to the intersection. A third remote vehicle 12500 is shown traversing southbound toward the intersection along the first road 12200. A current trajectory for the third remote vehicle 12500 is indicated using a solid directional line.

The autonomous vehicle 12100 may approach the intersection by traversing the first road 12200 to arrive at the location as shown in FIG. 12. The autonomous vehicle operational management system of the autonomous vehicle 12100 may identify saliency information based on a set of non-overlapping saliency sectors, such as the non-overlapping saliency sectors 8010-8120 shown in FIG. 8, for traversing the portion 12000 of the vehicle transportation network shown in FIG. 12. For simplicity and clarity, identified saliency regions 12600-12630 are indicated using broken line outlines in FIG. 12. Although FIG. 12 shows the identified saliency regions 12600-12630 and omits the other saliency regions for simplicity and clarity, the other saliency regions, such as shown in FIG. 8, may be included in the set of non-overlapping saliency sectors. The autonomous vehicle operational management system of the autonomous vehicle 12100 may identify saliency distance information, saliency priority information, or a combination thereof, corresponding to respective saliency sectors.

The autonomous vehicle operational management system of the autonomous vehicle 12100 may operate an intersection monitor, such as the intersection monitor 4230 shown in FIG. 4, which may include instantiating the intersection monitor. The intersection monitor may process or evaluate vehicle transportation network data, such as map data, sensor data, or a combination thereof, representing a portion of the vehicle transportation network, such as a portion corresponding to an identified route for the autonomous vehicle 12100, a portion spatially proximate to the autonomous vehicle 12100, or an expected path 12110 for the autonomous vehicle 12100, or a combination thereof. The intersection monitor may identify or generate operational environment information representing the operational environment, or an aspect thereof, of the autonomous vehicle 12100.

The intersection monitor may determine, such as based on the vehicle transportation network information, that the operational environment of the autonomous vehicle includes the intersection, and may identify, such as based on the previously identified external object information, the first remote vehicle 12300 ahead and to the right of the autonomous vehicle, and the second remote vehicle 12400 ahead and to the left of the autonomous vehicle.

The intersection monitor may identify expected relative location information corresponding to each remote vehicle 12300, 12400, 12500. The intersection monitor may identify respective saliency regions corresponding to the expected relative locations for the remote vehicles 12300, 12400, 12500. The intersection monitor may identify a priority, such as the high priority, for each saliency region corresponding to a remote vehicle 12300, 12400, 12500.

As shown, the autonomous vehicle operational management system of the autonomous vehicle 12100 may identify a high priority for the saliency region corresponding to the near saliency distance for the saliency sector 12600 north-east of the autonomous vehicle 12100. The autonomous vehicle operational management system of the autonomous vehicle 12100 may identify a high priority for the saliency region corresponding to the far saliency distance for the saliency sector 12610 north-north-east of the autonomous vehicle 12100, which includes a portion of the first remote vehicle 12300. The autonomous vehicle operational management system of the autonomous vehicle 12100 may identify a high priority for the saliency region corresponding to the far saliency distance for the saliency sector 12620 north-north-west of the autonomous vehicle 12100, which includes a portion of the first remote vehicle 12300 and includes the third remote vehicle 12500. The autonomous vehicle operational management system of the autonomous vehicle 12100 may identify a high priority for the saliency region corresponding to the near saliency distance for the saliency sector 12630 north-west of the autonomous vehicle 12100, which includes the second remote vehicle 12400.

The intersection monitor may identify a right-of-way boundary location or another location in the vehicle transportation network, such as a location corresponding to a stop line in the vehicle transportation network as shown at 12202. The right-of-way boundary location may be a location in the vehicle transportation network along an expected path 12110 of the autonomous vehicle 12100 between a current location of the autonomous vehicle 12100 and a right-of-way overlap area proximate to, such as immediately adjacent to or one meter from, the right-of-way overlap area which may be the closest location in the vehicle transportation network along the expected path 12110 for the autonomous vehicle 12100 to the right-of-way overlap area that the autonomous vehicle 12100 may safely traverse without entering the right-of-way overlap area. The intersection monitor may identify a saliency region corresponding to the expected relative orientation of the stop line or right-of-way boundary location relative to the current location of the autonomous vehicle 12100. The intersection monitor may identify a priority, such as the high priority, for the saliency region corresponding to the expected relative orientation of the stop line or right-of-way boundary location relative to the current location of the autonomous vehicle 12100. The intersection monitor may identify a saliency region along a current trajectory or expected path 12110 of the autonomous vehicle 12100 and may identify a priority, such as the low priority, for the saliency region along the current trajectory or expected path 12110 of the autonomous vehicle 12100.

The autonomous vehicle operational management system of the autonomous vehicle 12100 may transmit, send, or otherwise make available, such as by storing in a shared memory, the identified saliency information to the perception unit of the autonomous vehicle 12100. For example, the autonomous vehicle operational management system of the autonomous vehicle 12100 may transmit, set, or otherwise make available, to the perception unit of the autonomous vehicle 12100 saliency information indicating the high priority for the near saliency distance for the saliency sector 12600 north-east of the autonomous vehicle 12100, the high priority for the far saliency distance for the saliency sector 12610 north-north-east of the autonomous vehicle 12100, the high priority for the far saliency distance for the saliency sector 12620 north-north-west of the autonomous vehicle 12100, and the high priority for the near saliency distance for the saliency sector 12630 north-west of the autonomous vehicle 12100. The saliency information may identify a low priority, or may omit saliency information, for the other saliency regions.

The perception unit of the autonomous vehicle 12100 may obtain the saliency information and may correlate the saliency information to the respective fields-of-view of the image capture units of the autonomous vehicle 12100.

The perception unit of the autonomous vehicle 12100 may determine that the identified saliency regions 12600-12630 correspond spatially with the field of view 12700 of a center-forward image capture unit, such as the center-forward image capture unit 6100 shown in FIG. 6, of the autonomous vehicle 12100.

The perception unit of the autonomous vehicle 12100 may generate external object information using sensor data captured, or otherwise generated, by the sensors corresponding to the identified saliency regions 12600-12630, such as a center-forward image capture unit of the autonomous vehicle 12100.

For example, the perception control unit may identify the forward image processing unit as associated with the right-front image capture unit of the autonomous vehicle, the center image capture unit of the autonomous vehicle, and the left-front image capture unit of the autonomous vehicle, and may send, transmit, or otherwise provide the saliency information, or a corresponding portion thereof, to the front image processing unit. In some implementations, the perception control unit may omit sending saliency information to the rear image processing unit or may send saliency information to the rear image processing unit indicating an absence of salient regions corresponding to the rear image processing unit. In some implementations, the perception control unit may send the saliency information to both the front image processing unit and the rear image processing unit.

The perception unit of the autonomous vehicle 12100 may transmit, send, or otherwise make available, such as by storing in a shared memory, the external object information to the autonomous vehicle operational management system of the autonomous vehicle 12100.

The autonomous vehicle operational management controller may detect or identify one or more scenarios based on operational environment information including the external object information. For example, the autonomous vehicle operational management controller may detect or identify a first intersection scenario corresponding to the intersection and the first remote vehicle 12300, a second intersection scenario corresponding to the intersection and the second remote vehicle 12400, and a third second intersection scenario corresponding to the intersection and the third remote vehicle 12500.

The autonomous vehicle operational management controller may instantiate one or more SSOCEM instances and may send, or otherwise make available, the operational environment information to the SSOCEM instances, in response to detecting or identifying scenarios. For example, the autonomous vehicle operational management controller may instantiate a first intersection-SSOCEM instance for the first intersection scenario corresponding to the intersection and the first remote vehicle 12300, the autonomous vehicle operational management controller may instantiate a second intersection-SSOCEM instance for the second intersection scenario corresponding to the intersection and the second remote vehicle 12400, and the autonomous vehicle operational management controller may instantiate a third intersection-SSOCEM instance for the third intersection scenario corresponding to the intersection and the third remote vehicle 12500.

Instantiating the SSOCEM instances may include identifying a solution or policy for a model of the respective vehicle operational scenario. Identifying the solution or policy for the model of the vehicle operational scenario may include solving the corresponding SSOCEM model. Instantiating a respective SSOCEM instance may include instantiating an instance of the corresponding solution or policy.

The first intersection-SSOCEM solution instance may generate a first candidate vehicle control action, such as 'stop', 'orientation-adjust', or 'proceed', based on the respective modeled scenario and the corresponding operational environment information, and may output the respective candidate vehicle control action to the autonomous vehicle operational management controller, such as by sending the respective candidate vehicle control action to the autonomous vehicle operational management controller or storing the respective candidate vehicle control action for access by the autonomous vehicle operational management controller.

The second intersection-SSOCEM solution instance may generate a second candidate vehicle control action, such as 'stop', 'orientation-adjust', or 'proceed', based on the respective modeled scenario and the corresponding operational environment information, and may output the respective candidate vehicle control action to the autonomous vehicle operational management controller, such as by sending the respective candidate vehicle control action to the autonomous vehicle operational management controller or storing the respective candidate vehicle control action for access by the autonomous vehicle operational management controller.

The third intersection-SSOCEM solution instance may generate a third candidate vehicle control action, such as 'stop', 'orientation-adjust', or 'proceed', based on the respective modeled scenario and the corresponding operational environment information, and may output the respective candidate vehicle control action to the autonomous vehicle operational management controller, such as by sending the respective candidate vehicle control action to the autonomous vehicle operational management controller or storing the respective candidate vehicle control action for access by the autonomous vehicle operational management controller.

The autonomous vehicle operational management controller may receive the candidate vehicle control actions from the respective instantiated SSOCEM instances and may identify a vehicle control action based on the received candidate vehicle control actions for controlling the autonomous vehicle 12100 at the corresponding temporal location and may control the autonomous vehicle to traverse the vehicle transportation network, or a portion thereof, in accordance with the identified vehicle control action.

Figure 13:
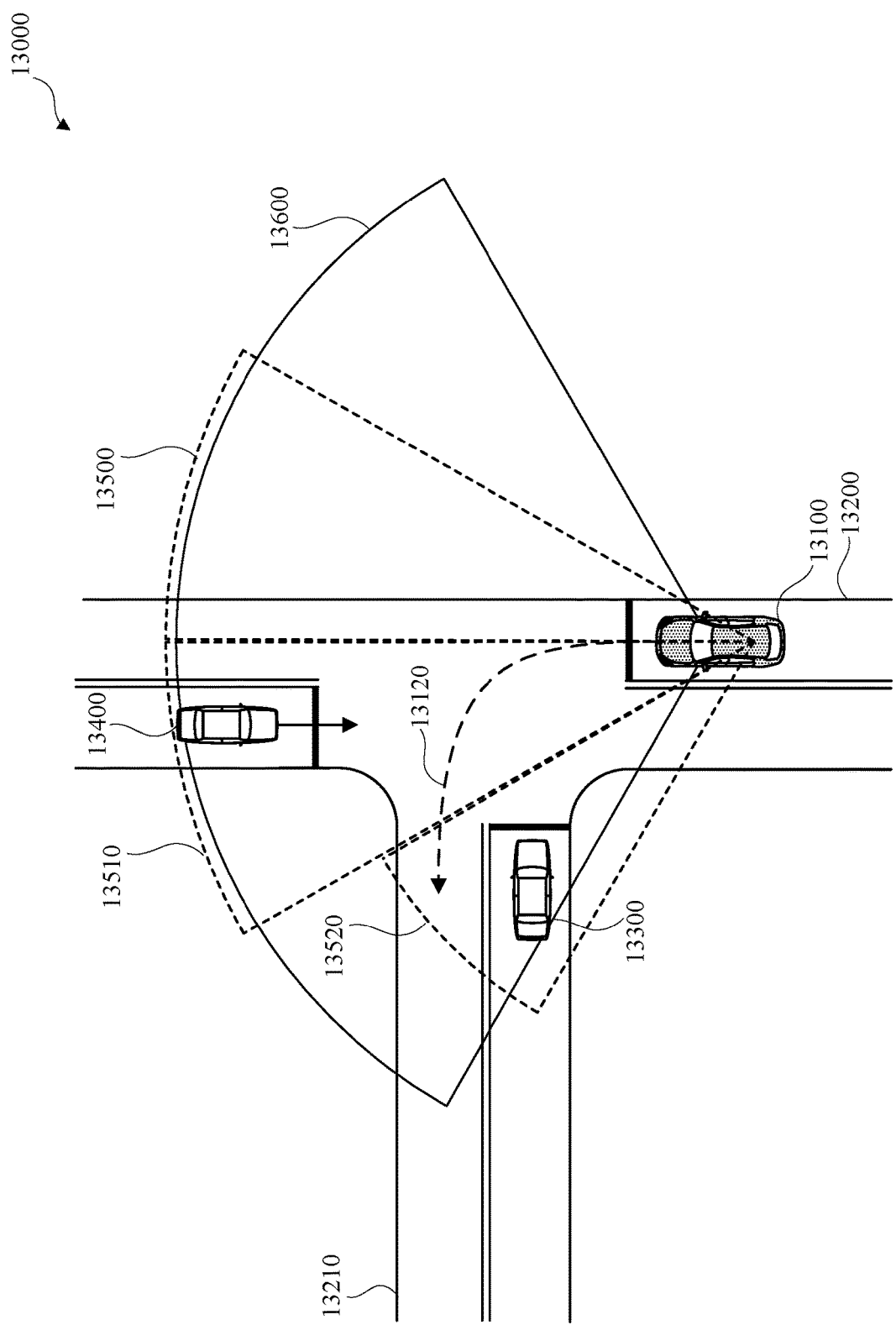
FIG. 13 is a diagram of an example of another portion of a vehicle transportation network including an intersection scenario and a pedestrian scenario in accordance with embodiments of this disclosure.

FIG. 13 is a diagram of an example of another portion 13000 of a vehicle transportation network including an intersection scenario and a pedestrian scenario in accordance with embodiments of this disclosure. Autonomous vehicle operational management may include an autonomous vehicle 13100, such as the vehicle 1000 shown in FIG. 1, one of the vehicles 2100/2110 shown in FIG. 2, one of the vehicles 6000, 7000, 8000, 9000 shown in FIGS. 6-9, a semi-autonomous vehicle, or any other vehicle implementing autonomous driving, operating an autonomous vehicle operational management system, such as the autonomous vehicle operational management system 4000 shown in FIG. 4, which may include a model of an autonomous vehicle operational control scenario that includes the autonomous vehicle 13100 traversing a portion of the vehicle transportation network along a first road 13200 approaching an intersection with a second road 13210. For simplicity and clarity, the portion 13000 of the vehicle transportation network shown in FIG. 13 is oriented with north at the top and east at the right.

A first remote vehicle 13300 is shown traversing eastbound along the second road 13210. The first remote vehicle 13300 is shown as stationary at a stop line adjacent to the intersection. A second remote vehicle 13400 is shown traversing southbound toward the intersection along the first road 13200. A current trajectory for the second remote vehicle 13400 is indicated using a solid directional line.

The autonomous vehicle 13100 may approach the intersection by traversing the first road 13200 to arrive at the location as shown in FIG. 13. The autonomous vehicle operational management system of the autonomous vehicle 13100 may identify saliency information based on a set of non-overlapping saliency sectors, such as the non-overlapping saliency sectors 8010-8120 shown in FIG. 8, for traversing the portion 13000 of the vehicle transportation network shown in FIG. 13. For simplicity and clarity, identified saliency regions 13500-13520 are indicated using broken line outlines in FIG. 13. Although FIG. 13 shows the identified saliency regions 13500-13520 and omits the other saliency regions for simplicity and clarity, the other saliency regions, such as shown in FIG. 8, may be included in the set of non-overlapping saliency sectors. The autonomous vehicle operational management system of the autonomous vehicle 13100 may identify saliency distance information, saliency priority information, or a combination thereof, corresponding to respective saliency sectors.

The autonomous vehicle operational management system of the autonomous vehicle 13100 may operate an intersection monitor, such as the intersection monitor 4230 shown in FIG. 4, which may include instantiating the intersection monitor. The intersection monitor may process or evaluate vehicle transportation network data, such as map data, sensor data, or a combination thereof, representing a portion of the vehicle transportation network, such as a portion corresponding to an identified route for the autonomous vehicle 13100, a portion spatially proximate to the autonomous vehicle 13100, or an expected path 13110 for the autonomous vehicle 13100, or a combination thereof. The intersection monitor may identify or generate operational environment information representing the operational environment, or an aspect thereof, of the autonomous vehicle 13100.

The intersection monitor may determine, such as based on the vehicle transportation network information, that the operational environment of the autonomous vehicle includes the intersection, and may identify, such as based on the previously identified external object information, the first remote vehicle 13300 ahead and to the left of the autonomous vehicle, and the second remote vehicle 13400 ahead of the autonomous vehicle.

The intersection monitor may identify expected relative location information corresponding to each remote vehicle 13300, 13400. The intersection monitor may identify respective saliency regions corresponding to the expected relative locations for the remote vehicles 13300, 13400. The intersection monitor may identify a priority, such as the high priority, for each saliency region corresponding to a remote vehicle 13300, 13400.

As shown, the autonomous vehicle operational management system of the autonomous vehicle 13100 may identify a high priority for the saliency region corresponding to the far saliency distance for the saliency sector 13500 north-north-east of the autonomous vehicle 13100. The autonomous vehicle operational management system of the autonomous vehicle 13100 may identify a high priority for the saliency region corresponding to the far saliency distance for the saliency sector 13510 north-north-west of the autonomous vehicle 13100, which includes the second remote vehicle 13400. The autonomous vehicle operational management system of the autonomous vehicle 13100 may identify a high priority for the saliency region corresponding to the near saliency distance for the saliency sector 13520 north-west of the autonomous vehicle 13100, which includes the first remote vehicle 13300.

The intersection monitor may identify a right-of-way boundary location or another location in the vehicle transportation network, such as a location corresponding to a stop line in the vehicle transportation network as shown. The right-of-way boundary location may be a location in the vehicle transportation network along an expected path 13110 of the autonomous vehicle 13100 between a current location of the autonomous vehicle 13100 and a right-of-way overlap area proximate to, such as immediately adjacent to or one meter from, the right-of-way overlap area which may be the closest location in the vehicle transportation network along the expected path 13110 for the autonomous vehicle 13100 to the right-of-way overlap area that the autonomous vehicle 13100 may safely traverse without entering the right-of-way overlap area. The intersection monitor may identify a saliency region corresponding to the expected relative orientation of the stop line or right-of-way boundary location relative to the current location of the autonomous vehicle 13100. The intersection monitor may identify a priority, such as the high priority, for the saliency region corresponding to the expected relative orientation of the stop line or right-of-way boundary location relative to the current location of the autonomous vehicle 13100. The intersection monitor may identify a saliency region along a current trajectory or expected path 13110 of the autonomous vehicle 13100 and may identify a priority, such as the low priority, for the saliency region along the current trajectory or expected path 13110 of the autonomous vehicle 13100.

The autonomous vehicle operational management system of the autonomous vehicle 13100 may transmit, send, or otherwise make available, such as by storing in a shared memory, the identified saliency information to the perception unit of the autonomous vehicle 13100. For example, the autonomous vehicle operational management system of the autonomous vehicle 13100 may transmit, set, or otherwise make available, to the perception unit of the autonomous vehicle 13100 saliency information indicating the high priority for the far saliency distance for the saliency sector 13500 north-north-east of the autonomous vehicle 13100, the high priority for the far saliency distance for the saliency sector 13510 north-north-west of the autonomous vehicle 13100, and the high priority for the near saliency distance for the saliency sector 13520 north-west of the autonomous vehicle 13100. The saliency information may identify a low priority, or may omit saliency information, for the other saliency regions.

The perception unit of the autonomous vehicle 13100 may obtain the saliency information and may correlate the saliency information to the respective fields-of-view of the image capture units of the autonomous vehicle 13100.

The perception unit of the autonomous vehicle 13100 may determine that the identified saliency regions 13500-13520 correspond spatially with the field of view 13600 of a center-forward image capture unit, such as the center-forward image capture unit 6100 shown in FIG. 6, of the autonomous vehicle 13100.

The perception unit of the autonomous vehicle 13100 may generate external object information using sensor data captured, or otherwise generated, by the sensors corresponding to the identified saliency regions 13500-13520, such as a center-forward image capture unit of the autonomous vehicle 13100.

For example, the perception control unit may identify the forward image processing unit as associated with the right-front image capture unit of the autonomous vehicle, the center image capture unit of the autonomous vehicle, and the left-front image capture unit of the autonomous vehicle, and may send, transmit, or otherwise provide the saliency information, or a corresponding portion thereof, to the front image processing unit. In some implementations, the perception control unit may omit sending saliency information to the rear image processing unit or may send saliency information to the rear image processing unit indicating an absence of salient regions corresponding to the rear image processing unit. In some implementations, the perception control unit may send the saliency information to both the front image processing unit and the rear image processing unit.

The perception unit of the autonomous vehicle 13100 may transmit, send, or otherwise make available, such as by storing in a shared memory, the external object information to the autonomous vehicle operational management system of the autonomous vehicle 13100.

The autonomous vehicle operational management controller may detect or identify one or more scenarios based on operational environment information including the external object information. For example, the autonomous vehicle operational management controller may detect or identify a first intersection scenario corresponding to the intersection and the first remote vehicle 13300, and a second intersection scenario corresponding to the intersection and the second remote vehicle 13400.

The autonomous vehicle operational management controller may instantiate one or more SSOCEM instances and may send, or otherwise make available, the operational environment information to the SSOCEM instances, in response to detecting or identifying scenarios. For example, the autonomous vehicle operational management controller may instantiate a first intersection-SSOCEM instance for the first intersection scenario corresponding to the intersection and the first remote vehicle 13300, the autonomous vehicle operational management controller may instantiate a second intersection-SSOCEM instance for the second intersection scenario corresponding to the intersection and the second remote vehicle 13400, and the autonomous vehicle operational management controller may instantiate a third intersection-SSOCEM instance for the third intersection scenario corresponding to the intersection and the third remote vehicle 13500.

Instantiating the SSOCEM instances may include identifying a solution or policy for a model of the respective vehicle operational scenario. Identifying the solution or policy for the model of the vehicle operational scenario may include solving the corresponding SSOCEM model. Instantiating a respective SSOCEM instance may include instantiating an instance of the corresponding solution or policy.

The first intersection-SSOCEM solution instance may generate a first candidate vehicle control action, such as 'stop', 'orientation-adjust', or 'proceed', based on the respective modeled scenario and the corresponding operational environment information, and may output the respective candidate vehicle control action to the autonomous vehicle operational management controller, such as by sending the respective candidate vehicle control action to the autonomous vehicle operational management controller or storing the respective candidate vehicle control action for access by the autonomous vehicle operational management controller.

The second intersection-SSOCEM solution instance may generate a second candidate vehicle control action, such as 'stop', 'orientation-adjust', or 'proceed', based on the respective modeled scenario and the corresponding operational environment information, and may output the respective candidate vehicle control action to the autonomous vehicle operational management controller, such as by sending the respective candidate vehicle control action to the autonomous vehicle operational management controller or storing the respective candidate vehicle control action for access by the autonomous vehicle operational management controller.

The autonomous vehicle operational management controller may receive the candidate vehicle control actions from the respective instantiated SSOCEM instances and may identify a vehicle control action based on the received candidate vehicle control actions for controlling the autonomous vehicle 13100 at the corresponding temporal location and may control the autonomous vehicle to traverse the vehicle transportation network, or a portion thereof, in accordance with the identified vehicle control action.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method for use in traversing a vehicle transportation network, the method comprising:
   traversing, by an autonomous vehicle, a vehicle transportation network, wherein the autonomous vehicle includes a perception unit and an autonomous vehicle operational management controller, and wherein traversing the vehicle transportation network includes:

operating the perception unit, wherein operating the perception unit includes the perception unit:
  receiving saliency information from the autonomous vehicle operational management controller;
  generating, based on the saliency information, external object information corresponding to one or more external objects within a defined distance of the autonomous vehicle, wherein generating the external object information includes:
    receiving sensor information from a sensor of the autonomous vehicle;
    identifying a salient portion of the sensor information based on the saliency information such that the sensor information is a sum of the salient portion and a non-salient portion of the sensor information; and
    generating the external object information based on the salient portion such that generating the external object information omits using the non-salient portion; and
  outputting the external object information to the autonomous vehicle operational management controller;
operating the autonomous vehicle operational management controller, wherein operating the autonomous vehicle operational management controller includes the autonomous vehicle operational management controller:
  generating an autonomous vehicle operational control environment for operating a scenario-specific operational control evaluation module instance, wherein the scenario-specific operational control evaluation module instance includes an instance of a scenario-specific operational control evaluation model of a distinct vehicle operational scenario, and wherein operating the scenario-specific operational control evaluation module instance includes identifying a policy for the scenario-specific operational control evaluation model;
  identifying the distinct vehicle operational scenario based on the external object information;
  instantiating the scenario-specific operational control evaluation module instance;
  receiving a candidate vehicle control action from the policy for the scenario-specific operational control evaluation module instance; and
  controlling the autonomous vehicle to traverse a portion of the vehicle transportation network in accordance with the candidate vehicle control action, wherein the portion of the vehicle transportation network includes the distinct vehicle operational scenario.

2. The method of claim 1, wherein:
receiving the sensor information includes receiving the sensor information from a plurality of sensors of the autonomous vehicle.

3. The method of claim 2, wherein:
the saliency information indicates a saliency sector relative to the autonomous vehicle; and
identifying the salient portion includes identifying the salient portion such that the salient portion spatially corresponds with the saliency sector.

4. The method of claim 3, wherein the saliency sector is one of a plurality of non-overlapping saliency sectors relative to the autonomous vehicle, wherein a sum of the plurality of non-overlapping saliency sectors form a contiguous saliency range relative to the autonomous vehicle.

5. The method of claim 2, wherein:
the saliency information indicates a saliency distance relative to the autonomous vehicle; and
identifying the salient portion includes determining a size of the salient portion based on the saliency distance.

6. The method of claim 2, wherein:
for each saliency sector from a plurality of non-overlapping saliency sectors relative to the autonomous vehicle, the saliency information indicates a respective priority and a respective saliency distance relative to the autonomous vehicle.

7. The method of claim 2, wherein identifying the salient portion includes:
identifying candidate salient portions such that the sensor information is a sum of the candidate salient portions and the non-salient portion;
determining a respective priority for each candidate salient portion from the candidate salient portions based on the saliency information;
identifying a defined cardinality of the candidate salient portions as salient portions; and
including the candidate salient portions other than the salient portions in the non-salient portion, such that a minimum priority for the salient portions exceeds a maximum priority for the candidate salient portions in the non-salient portion.

8. The method of claim 2, wherein:
the sensor information includes substantially temporally contemporaneous images, wherein each image from the substantially temporally contemporaneous images corresponds to a respective sensor from the sensors; and
the salient portion is a spatially contiguous patch of an image from the substantially temporally contemporaneous images.

9. The method of claim 2, wherein:
identifying the salient portion includes omitting from the salient portion sensor information corresponding to a first sensor from the sensors; and
including in the salient portion sensor information corresponding to a second sensor from the sensors.

10. The method of claim 2, wherein:
the sensors include a first image capture unit having a first field of view and a second image capture unit having a second field of view, the first field of view partially overlapping the second field of view.

11. The method of claim 10, wherein:
the sensors include third image capture unit having a third field of view partially overlapping the first field of view and the second field of view.

12. The method of claim 10, wherein:
the sensors include third image capture unit having a third field of view, wherein the third field of view is non-overlapping with the first field of view and the second field of view.

13. The method of claim 2, wherein the sensors include:
a first image capture unit having a front field of view;
a second image capture unit having a first side field of view;
a third image capture unit having a second side field of view;
a fourth image capture unit having a third side field of view;
a fifth image capture unit having a fourth side field of view;
a sixth image capture unit having a first rear field of view; and a seventh image capture unit having a second rear field of view.

14. The method of claim 13, wherein:
the front field of view has a first angle of view and a first effective range;
the first side field of view has a second angle of view and a second effective range, wherein the first angle of view exceeds the second angle of view and the second effective range exceeds the first effective range;
the second side field of view has the second angle of view and the second effective range;
the third side field of view has a third angle of view and a third effective range, wherein the third angle of view exceeds the first angle of view and the first effective range exceeds the third effective range;
the fourth side field of view has the third angle of view and the third effective range;
the first rear field of view has a fourth angle of view and a fourth effective range, wherein the first angle of view exceeds the fourth angle of view and the fourth effective range exceeds the first effective range; and
the second rear field of view has the fourth angle of view and the fourth effective range.

15. The method of claim 13, wherein:
the perception unit includes:
a first image processing unit;
a second image processing unit; and
a perception control unit; and
generating the external object information includes:
the first image processing unit generating first image processing data based on sensor information from at least one of the first image capture unit, the second image capture unit, or the third image capture unit;
the second image processing unit generating second image processing data based on sensor information from at least one of the fourth image capture unit, the fifth image capture unit, the sixth image capture unit, or the seventh image capture unit; and
the perception control unit generating the external object information based on at least one of the first image processing data or the second image processing data.

16. The method of claim 2, wherein generating the external object information includes evaluating the salient portion using a deep learning object classification algorithm.

17. An autonomous vehicle comprising:
an autonomous vehicle operational management controller; and
a perception unit configured to execute instructions stored on a non-transitory computer readable medium to:
receive saliency information from the autonomous vehicle operational management controller;
generate, based on the saliency information, external object information corresponding to one or more external objects within a defined distance of the autonomous vehicle, wherein, to generate the external object information, the perception unit is configured to execute instructions stored on the non-transitory computer readable medium to:
receive sensor information from sensors of the autonomous vehicle;
identify a salient portion of the sensor information based on the saliency information such that the sensor information is a sum of the salient portion and a non-salient portion of the sensor information; and
generate the external object information based on the salient portion such that generating the external object information omits using the non-salient portion; and
output the external object information to the autonomous vehicle operational management controller;
the autonomous vehicle operational management controller configured to execute instructions stored on a non-transitory computer readable medium to:
generate an autonomous vehicle operational control environment for operating a scenario-specific operational control evaluation module instance, wherein the scenario-specific operational control evaluation module instance includes an instance of a scenario-specific operational control evaluation model of a distinct vehicle operational scenario, and wherein operating the scenario-specific operational control evaluation module instance includes identifying a policy for the scenario-specific operational control evaluation model;
identify the distinct vehicle operational scenario based on the external object information;
instantiate the scenario-specific operational control evaluation module instance;
receive a candidate vehicle control action from the policy for the scenario-specific operational control evaluation module instance; and
control the autonomous vehicle to traverse a portion of a vehicle transportation network in accordance with the candidate vehicle control action, wherein the portion of the vehicle transportation network includes the distinct vehicle operational scenario.

18. A method for use in traversing a vehicle transportation network, the method comprising:
traversing, by an autonomous vehicle, a vehicle transportation network, wherein the autonomous vehicle includes a perception unit and an autonomous vehicle operational management controller, and wherein traversing the vehicle transportation network includes:
operating the perception unit, wherein operating the perception unit includes the perception unit:
receiving saliency information from the autonomous vehicle operational management controller, wherein the saliency information indicates, for each saliency sector from a plurality of non-overlapping saliency sectors relative to the autonomous vehicle, a respective priority and a respective saliency distance relative to the autonomous vehicle;
receiving sensor information from sensors of the autonomous vehicle;
generating, based on the saliency information and the sensor information, external object information corresponding to one or more external objects within a defined distance of the autonomous vehicle, wherein generating the external object information includes:
identifying a salient portion of the sensor information based on the saliency information such that the sensor information is a sum of the salient portion and a non-salient portion of the sensor information, wherein identifying the salient portion includes identifying the salient portion such that the salient portion spatially corresponds with a saliency sector indicated as having a high priority in the saliency information, and wherein identifying the salient portion includes determining a size of the salient portion based on the saliency distance; and
generating the external object information based on the salient portion such that generating the external object information omits using the non-salient portion; and
outputting the external object information to the autonomous vehicle operational management controller;
operating the autonomous vehicle operational management controller, wherein operating the autonomous vehicle operational management controller includes the autonomous vehicle operational management controller:
generating an autonomous vehicle operational control environment for operating a scenario-specific operational control evaluation module instance, wherein the scenario-specific operational control evaluation module instance includes an instance of a scenario-specific operational control evaluation model of a distinct vehicle operational scenario, and wherein operating the scenario-specific operational control evaluation module instance includes identifying a policy for the scenario-specific operational control evaluation model;
identifying the distinct vehicle operational scenario based on the external object information;
instantiating the scenario-specific operational control evaluation module instance;
receiving a candidate vehicle control action from the policy for the scenario-specific operational control evaluation module instance; and
controlling the autonomous vehicle to traverse a portion of the vehicle transportation network in accordance with the candidate vehicle control action, wherein the portion of the vehicle transportation network includes the distinct vehicle operational scenario.

* * * * *